United States Patent
Lemley

(10) Patent No.: US 12,362,999 B2
(45) Date of Patent: *Jul. 15, 2025

(54) SERVICE ACTION GUIDANCE ENGINE (SAGE)

(71) Applicant: CenturyLink Intellectual Property LLC, Denver, CO (US)

(72) Inventor: Jaime D. Lemley, Apopka, FL (US)

(73) Assignee: CenturyLink Intellectual Property LLC, Denver, CO (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/673,005

(22) Filed: May 23, 2024

(65) Prior Publication Data

US 2024/0314035 A1   Sep. 19, 2024

Related U.S. Application Data

(63) Continuation of application No. 18/132,082, filed on Apr. 7, 2023, now Pat. No. 12,003,372, which is a continuation of application No. 17/491,205, filed on Sep. 30, 2021, now Pat. No. 11,627,044.

(60) Provisional application No. 63/229,205, filed on Aug. 4, 2021.

(51) Int. Cl.
| | |
|---|---|
| *H04L 12/00* | (2006.01) |
| *H04L 41/0631* | (2022.01) |
| *H04L 41/08* | (2022.01) |
| *H04L 41/5041* | (2022.01) |
| *H04L 41/5061* | (2022.01) |

(52) U.S. Cl.
CPC ...... *H04L 41/0886* (2013.01); *H04L 41/0631* (2013.01); *H04L 41/5048* (2013.01); *H04L 41/5061* (2013.01)

(58) Field of Classification Search
CPC ............. H04L 41/0886; H04L 41/0631; H04L 41/5048; H04L 41/5061; H04L 41/5067
USPC ....................................................... 709/224
See application file for complete search history.

(56) References Cited

U.S. PATENT DOCUMENTS

| | | |
|---|---|---|
| 8,175,539 B2 | 5/2012 | Diener |
| 8,594,304 B2 | 11/2013 | Werth |
| 8,838,532 B2 | 9/2014 | Fan |
| 9,304,827 B2 | 4/2016 | Werth |
| 9,477,500 B2 | 10/2016 | Basavaiah |
| 9,659,465 B2 | 5/2017 | Forrest |
| 9,699,044 B2 | 7/2017 | Embree |

(Continued)

*Primary Examiner* — Frantz Coby

(57) ABSTRACT

Novel tools and techniques are provided for implementing service diagnostics and provisioning via a service action guidance engine ("SAGE"). In various embodiments, SAGE may autonomously analyze data to identify any issues with provisioning one or more first services, among a plurality of services, to a first customer of a service provider. SAGE may autonomously identify one or more first automation actions from a plurality of automation actions to address at least one first issue identified based on the analysis, and may autonomously send one or more first instructions to one or more first automation bots, among a plurality of automation bots, to perform the identified one or more first automation actions. SAGE may also generate and present one or more guidance messages to call center users to guide interaction between customers and the call center users, based on analysis data associated with provisioning of services to the customers.

18 Claims, 9 Drawing Sheets

(56) References Cited

U.S. PATENT DOCUMENTS

| | | | |
|---|---|---|---|
| 9,877,213 B1 | 1/2018 | Wang | |
| 10,104,053 B2 | 10/2018 | Wipfel | |
| 10,313,211 B1 | 6/2019 | Rastogi | |
| 10,440,120 B2 | 10/2019 | Galula | |
| 10,440,184 B1 | 10/2019 | Mackie | |
| 10,503,536 B2 | 12/2019 | Gunda | |
| 10,587,481 B2 | 3/2020 | Natham | |
| 10,645,219 B1 | 5/2020 | Mackie | |
| 10,797,966 B2 | 10/2020 | Boutros | |
| 10,802,893 B2 | 10/2020 | Chanda | |
| 10,805,332 B2 | 10/2020 | Gunda | |
| 10,805,809 B2 | 10/2020 | Veggalam | |
| 10,896,084 B2 | 1/2021 | Bagarolo | |
| 10,897,392 B2 | 1/2021 | Mishra | |
| 11,399,295 B2 | 7/2022 | Osinski | |
| 11,627,044 B2 * | 4/2023 | Lemley | H04L 41/5048 709/224 |
| 12,003,372 B2 * | 6/2024 | Lemley | H04L 41/0886 |
| 2016/0343001 A1 | 11/2016 | Hawes | |
| 2023/0044433 A1 | 2/2023 | Lemley | |
| 2023/0261944 A1 | 8/2023 | Lemley | |

\* cited by examiner

SERVICE ACTION GUIDANCE ENGINE (SAGE)

COPYRIGHT STATEMENT

A portion of the disclosure of this patent document contains material that is subject to copyright protection. The copyright owner has no objection to the facsimile reproduction by anyone of the patent document or the patent disclosure as it appears in the Patent and Trademark Office patent file or records, but otherwise reserves all copyright rights whatsoever.

FIELD

The present disclosure relates, in general, to methods, systems, and apparatuses for implementing service diagnostics and provisioning, and, more particularly, to methods, systems, and apparatuses for implementing service diagnostics and provisioning via a service action guidance engine ("SAGE").

BACKGROUND

Conventional service diagnostics and provisioning rely on human call center agents and dispatched field technicians to perform corrections to issues arising in provisioning of services to customers. This results in inconsistent customer service responses due to varied levels of experience and expertise among the numerous call center agents and field technicians. Moreover, a vast number of typical corrections or actions to resolve issues encountered by customers involve needless dispatching of field technicians when appropriate autonomous and/or remote actions are able to resolve the issues, which results in excessive costs and needless expending of resources (in the form of truck rolls, time spent by technicians, materials expended in the course of repairs, time that services provided to the customer are not operational, etc.). Conventional systems also do not autonomously anticipate issues and resolve such issues. Rather, a customer must first call a call center agent in order to initiate customer or service issue resolution, which burdens the customer and the call center agent, while reducing customer satisfaction due to time and effort required to bring the issues to the attention of the service provider and due to lack of trust or faith in the services provided.

Hence, there is a need for more robust and scalable solutions for implementing service diagnostics and provisioning, and, more particularly, to methods, systems, and apparatuses for implementing service diagnostics and provisioning via a service action guidance engine ("SAGE").

BRIEF DESCRIPTION OF THE DRAWINGS

A further understanding of the nature and advantages of particular embodiments may be realized by reference to the remaining portions of the specification and the drawings, in which like reference numerals are used to refer to similar components. In some instances, a sub-label is associated with a reference numeral to denote one of multiple similar components. When reference is made to a reference numeral without specification to an existing sub-label, it is intended to refer to all such multiple similar components.

DETAILED DESCRIPTION OF CERTAIN EMBODIMENTS

Overview

Figure 1:
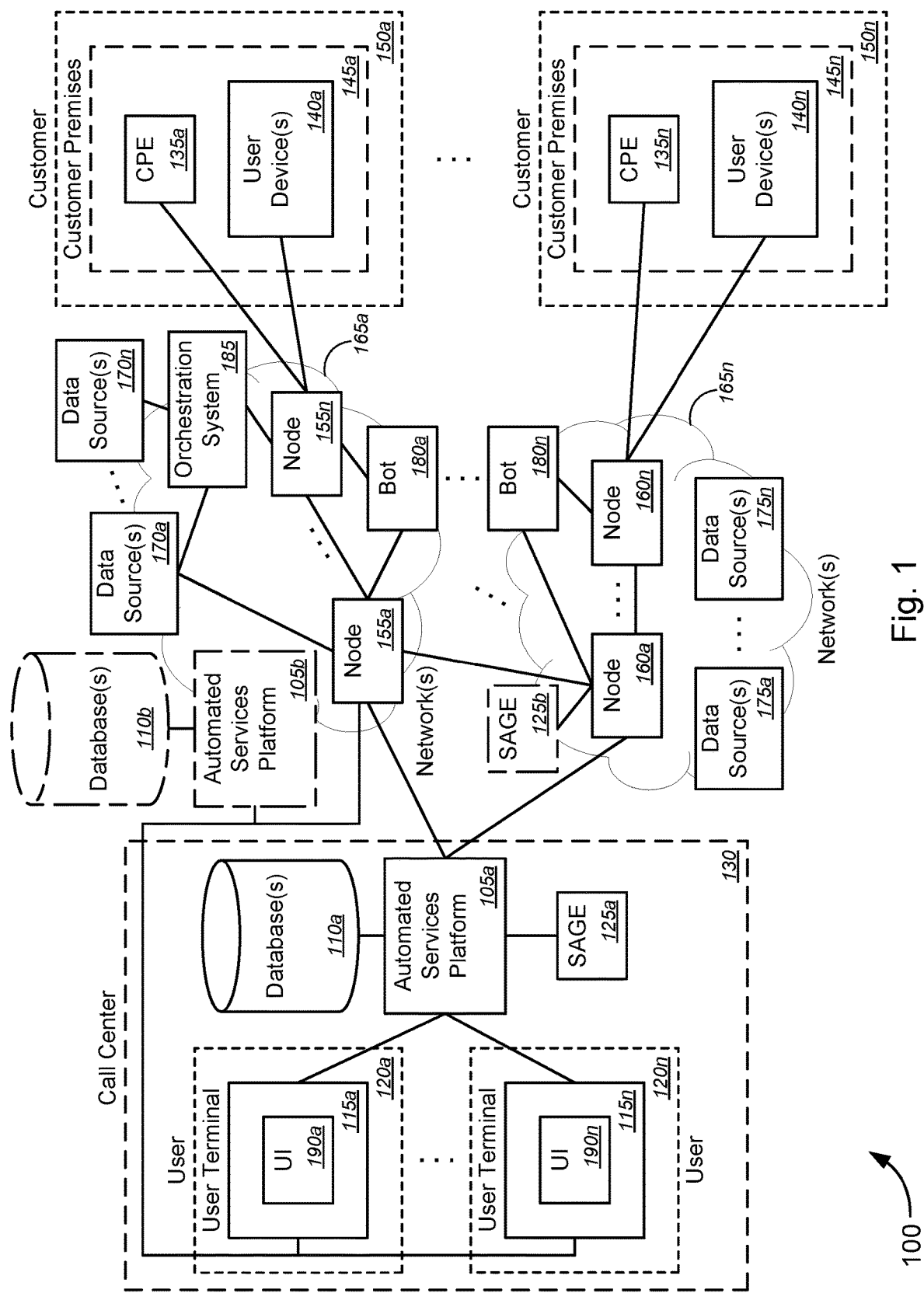
FIG. 1 is a schematic diagram illustrating a system for implementing service diagnostics and provisioning via a service action guidance engine ("SAGE"), in accordance with various embodiments.

Various embodiments provide tools and techniques for implementing service diagnostics and provisioning, and, more particularly, to methods, systems, and apparatuses for implementing service diagnostics and provisioning via a service action guidance engine ("SAGE").

In various embodiments, a service action guidance engine ("SAGE") may autonomously analyze first data to identify any issues with provisioning one or more first services, among a plurality of services, to at least one first customer of a service provider. In some cases, autonomously analyzing the first data to identify any issues with provisioning the one or more first services to the at least one first customer may comprise at least one of continually, periodically, randomly, or reactively monitoring second data to identify any new issues with provisioning the one or more first services to the at least one first customer.

In some instances, the second data may include, without limitation, at least one of the first data, historical data associated with provisioning the one or more first services to the at least one first customer, or updated data associated with provisioning the one or more first services to the at least one first customer, and/or the like. In some cases, reactively monitoring the second data may comprise monitoring the second data in response to one or more trigger events. In some embodiments, the one or more trigger events may include, but are not limited to, at least one of a determined change in data associated with provisioning the one or more first services, a request to change at least one configuration of one or more nodes for provisioning the one or more first services, a request to change at least one setting of the one or more nodes for provisioning the one or more first services, a request to change at least one configuration of a network profile associated with the at least one first customer, a request to change at least one setting of the network profile associated with the at least one first customer, a determined change in at least one configuration of the one or more nodes for provisioning the one or more first services, a determined change in at least one setting of the one or more nodes for provisioning the one or more first services, a determined change in at least one configuration of the network profile associated with the at least one first customer, or a determined change in at least one setting of the network profile associated with the at least one first customer, and/or the like.

In some embodiments, SAGE may autonomously identify one or more first automation actions from a plurality of automation actions to address at least one first issue identified based on the analysis, and may autonomously send one or more first instructions to one or more first automation bots, among a plurality of automation bots, to perform the identified one or more first automation actions. In some instances, information regarding the plurality of automation actions may be contained within a library of automation actions that are stored in a database, where autonomously identifying the one or more first automation actions to address the determined at least one first issue may comprise SAGE autonomously identifying the one or more first automation actions from the plurality of automation actions contained within the library of automation actions that are stored in the database, to address the at least one first issue.

According to some embodiments, autonomously analyzing the first data to identify any issues with provisioning the one or more first services and autonomously identifying the one or more first automation actions from the plurality of automation actions may each be performed using at least one of a machine learning ("ML") system, a deep learning ("DL") system, or an artificial intelligence ("AI") system, and/or the like.

Merely by way of example, in some cases, the one or more first automation bots may include, but are not limited to, one of: the one or more first data sources, among the plurality of data sources, that collect the first data that is indicative of the at least one first issue; one or more second automation bots that are separate from the one or more first data sources that collect the first data, where the one or more second automation bots are identified subsequent to identifying the one or more first automation actions based on its capability of performing the identified one or more first automation actions; or one or more third automation bots that are separate from the one or more first data sources that collect the first data, where the one or more third automation bots are selected for performing the identified one or more first automation actions based on proximity to at least one of a source of the at least one first issue or a determined location for implementing the identified one or more first automation actions; and/or the like.

In some embodiments, SAGE may analyze at least one of information regarding provisioning the one or more first services, information regarding the one or more first services, information regarding a customer account of the at least one first customer, or a generated transcript of current and previous communications between the at least one first customer and a call center user, and/or the like. SAGE may then generate and present one or more guidance messages to the call center user to guide interaction between the at least one first customer and the call center user, based on the analysis.

In the various embodiments, service diagnostics and provisioning via SAGE may provide autonomous performance of functionalities in the background without human instruction, while autonomously analyzing data (such as data from any one or more of the various types of data sources described herein) on a continual, periodic, random, or reactive manner, and/or the like, to identify issues with provisioning of services to customers and to identify autonomous actions for autonomous bots to take to resolve any identified issues. In this manner, a customer need not have to initiate service issue resolution by calling the service provider's call center, as the system automatically analyzes the data to anticipate issues that may affect one or more customers, and autonomously controls autonomous bots to perform autonomous actions to address said issues. Alternatively, or additionally, SAGE guides interactions between customers and call center agents based on analyses of similar data. As such, in most cases, truck rolls (i.e., dispatching field technicians, etc.) may be avoided, while quickly and efficiently addressing customer issues (in some cases, without the customers even being aware of the issues), resulting in better service to the customer and greater customer satisfaction.

These and other aspects of the service diagnostics and provisioning via service action guidance engine ("SAGE") are described in greater detail with respect to the figures.

The following detailed description illustrates a few exemplary embodiments in further detail to enable one of skill in the art to practice such embodiments. The described examples are provided for illustrative purposes and are not intended to limit the scope of the invention.

In the following description, for the purposes of explanation, numerous specific details are set forth in order to provide a thorough understanding of the described embodiments. It will be apparent to one skilled in the art, however, that other embodiments of the present invention may be practiced without some of these specific details. In other instances, certain structures and devices are shown in block diagram form. Several embodiments are described herein, and while various features are ascribed to different embodiments, it should be appreciated that the features described with respect to one embodiment may be incorporated with other embodiments as well. By the same token, however, no single feature or features of any described embodiment should be considered essential to every embodiment of the invention, as other embodiments of the invention may omit such features.

Unless otherwise indicated, all numbers used herein to express quantities, dimensions, and so forth used should be understood as being modified in all instances by the term "about." In this application, the use of the singular includes the plural unless specifically stated otherwise, and use of the terms "and" and "or" means "and/or" unless otherwise indicated. Moreover, the use of the term "including," as well as other forms, such as "includes" and "included," should be considered non-exclusive. Also, terms such as "element" or "component" encompass both elements and components comprising one unit and elements and components that comprise more than one unit, unless specifically stated otherwise.

Various embodiments described herein, while embodying (in some cases) software products, computer-performed methods, and/or computer systems, represent tangible, concrete improvements to existing technological areas, including, without limitation, service diagnostics technology, service provisioning technology, service diagnostics and provisioning technology, service management technology, call center technology, and/or the like. In other aspects, certain embodiments, can improve the functioning of user equipment or systems themselves (e.g., service diagnostics systems, service provisioning systems, service diagnostics and provisioning systems, service management systems, call center systems, etc.), for example, by autonomously analyzing, using a service action guidance engine ("SAGE"), first data to identify any issues with provisioning one or more first services, among a plurality of services, to at least one first customer of a service provider; based on a determination that at least one second issue affects provisioning of at least one second service among the one or more second services, autonomously identifying, using the SAGE, one or more second automation actions to address the determined at least one second issue; and autonomously sending, using the SAGE, one or more second instructions to one or more second automation bots, among the plurality of automation bots, to perform the identified one or more second automation actions; and/or the like.

In particular, to the extent any abstract concepts are present in the various embodiments, those concepts can be implemented as described herein by devices, software, systems, and methods that involve specific novel functionality (e.g., steps or operations), such as, SAGE autonomously analyzing data on a continual, periodic, random, or reactive manner, and/or the like, to identify issues with provisioning of services to customers and to identify autonomous actions for autonomous bots to take to resolve any identified issues (i.e., automatically analyzing the data to anticipate issues that may affect one or more customers, and autonomously controlling autonomous bots to perform autonomous actions to address said issues, or the like), and, in some cases, guiding interactions between customers and call center agents based on analyses of similar data. These functionalities can produce tangible results outside of the implementing computer system, including, merely by way of example, optimized diagnostic and provisioning of services to customers (and, in some cases, anticipation of potential issues to provisioning of such services, and autonomously correction of such potential issues without the customer being aware of such issues, or the like), and, in some instances, improved interactions between the customers and the call center agents, resulting in better service to the customer and greater customer satisfaction, and/or the like, to name a few examples, that extend beyond mere conventional computer processing operations, and/or the like, at least some of which may be observed or measured by customers and/or service providers.

In an aspect, a method may comprise: autonomously analyzing, using a service action guidance engine ("SAGE"), first data to identify any issues with provisioning one or more first services, among a plurality of services, to at least one first customer of a service provider; autonomously identifying, using the SAGE, one or more first automation actions from a plurality of automation actions to address at least one first issue identified based on the analysis; and autonomously sending, using the SAGE, one or more first instructions to one or more first automation bots, among a plurality of automation bots, to perform the identified one or more first automation actions.

In some embodiments, the SAGE may comprise at least one of a service diagnostics computing system, a service provisioning computing system, a service management computing system, a call center computing system, a machine learning ("ML") system, a deep learning ("DL") system, an artificial intelligence ("AI") system, a network operations center ("NOC") computing system, a server computer, a webserver, a cloud computing system, or a distributed computing system, and/or the like.

In some instances, information regarding the plurality of automation actions may be contained within a library of automation actions that are stored in a database, wherein autonomously identifying the one or more first automation actions to address the determined at least one first issue may comprise autonomously identifying, using the SAGE, the one or more first automation actions from the plurality of automation actions contained within the library of automation actions that are stored in the database, to address the at least one first issue.

According to some embodiments, the first data may comprise data associated with provisioning services to all customers of the service provider, wherein the method may further comprise: autonomously analyzing, using the SAGE, the first data to identify at least one of any common issues, any related issues, or any widespread issues with provisioning services, among the plurality of services, to a plurality of second customers of the service provider; based on a determination that at least one second issue affects provisioning of at least one second service among the one or more second services, autonomously identifying, using the SAGE, one or more second automation actions to address the determined at least one second issue; and autonomously sending, using the SAGE, one or more second instructions to one or more second automation bots, among the plurality of automation bots, to perform the identified one or more second automation actions.

In some embodiments, the first data may be collected by an automated services platform from each of one or more first data sources among a plurality of data sources by collecting the first data from each data source containing data directly associated with provisioning the one or more first services to the at least one first customer and from each data source containing data indirectly associated with provisioning the one or more first services. In some cases, the data indirectly associated with provisioning the one or more first services may comprise at least one of data retrieved from an outage reporting system that collects outage data associated with provisioning the one or more first services, data associated with provisioning the one or more first services that has been posted via an application programming interface ("API") call by the outage reporting system, data associated with other customers in proximity to the at least one first customer, data associated with network nodes along potential network paths configured to provision the one or more first services, or data associated with services unassociated with the one or more first services yet indicative of geographical events, natural events, or events caused by humans, and/or the like, that are determined to have a non-zero probability of affecting provisioning of the one or more first services to the at least one first customer, and/or the like.

In some instances, the plurality of data sources may comprise at least one of one or more network data sources, one or more network extended data sources, one or more customer data sources, one or more customer account data sources, one or more billing data sources, one or more dispatch data sources, one or more network tools, or one or more nodes disposed in at least one network via which at least one service among the plurality of services is provisioned, and/or the like. In some cases, the automated services platform may manage connections, and may communicate, with each of the plurality of data sources and with each of the plurality of automation bots, the plurality of data sources and the plurality of automation bots being disposed within one or more networks providing the one or more first services. In some instances, managing connections, and communicating, with each of the plurality of data sources may be performed via a first API between the automated services platform and each of the plurality of data sources, wherein managing connections, and communicating, with each of the plurality of automation bots may be performed via a second API between the automated services platform and each of the plurality of automation bots.

In some cases, collecting first data from each of the plurality of data sources may comprise collecting data from each of the plurality of data sources via an orchestration system, wherein autonomously sending the one or more first instructions to the one or more first automation bots comprises autonomously sending the one or more first instructions to the one or more first automation bots via the orchestration system, wherein the first API may communicatively couple the orchestration system with each of the plurality of data sources, wherein the second API may communicatively couple the orchestration system with each of the plurality of automation bots, wherein a third API may communicatively couple the orchestration system with the automated services platform, and wherein a fourth API may communicatively couple the automated services platform with the user terminal.

In some instances, the one or more first automation bots may comprise one of: the one or more first data sources, among the plurality of data sources, that collect the first data that is indicative of the at least one first issue; one or more second automation bots that are separate from the one or more first data sources that collect the first data, wherein the one or more second automation bots are identified subsequent to identifying the one or more first automation actions based on its capability of performing the identified one or more first automation actions; or one or more third automation bots that are separate from the one or more first data sources that collect the first data, wherein the one or more third automation bots are selected for performing the identified one or more first automation actions based on proximity to at least one of a source of the at least one first issue or a determined location for implementing the identified one or more first automation actions, and/or the like.

According to some embodiments, the method may further comprise, based on a determination that the one or more first automation bots have successfully resolved the at least one first issue via the identified one or more first automation actions and based on a determination that dispatch records of the service provider indicate that a field technician has already been dispatched to address the at least one first issue, autonomously sending, using the SAGE, one or more third instructions cancelling the dispatchment of the field technician to address the at least one first issue. In some cases, the method may further comprise autonomously sending, using the SAGE, one or more first messages indicating that the at least one first issue has been resolved.

Merely by way of example, in some cases, autonomously sending the one or more first messages indicating that the at least one first issue has been resolved may comprise at least one of: autonomously pushing, using the SAGE, one or more first notifications containing the one or more first messages to at least one user device associated with the at least one first customer; autonomously sending, using the SAGE, one or more first e-mail messages containing the one or more first messages to the at least one user device associated with the at least one first customer; autonomously sending, using the SAGE, one or more first text messages containing the one or more first messages to the at least one user device associated with the at least one first customer; autonomously sending, using the SAGE, one or more first multimedia messaging service ("MMS") messages containing the one or more first messages to the at least one user device associated with the at least one first customer; autonomously sending, using the SAGE, one or more first web portal messages containing the one or more first messages to a user account, via a web portal, that is accessible by the at least one first customer; autonomously pushing, using the SAGE, the one or more first notifications containing the one or more first messages to at least one user terminal associated with an agent of the service provider; autonomously sending, using the SAGE, the one or more first e-mail messages containing the one or more first messages to the at least one user terminal associated with the agent of the service provider; autonomously sending, using the SAGE, the one or more first text messages containing the one or more first messages to the at least one user terminal associated with the agent of the service provider; autonomously sending, using the SAGE, the one or more first multimedia messaging service ("MMS") messages containing the one or more first messages to the at least one user terminal associated with the agent of the service provider; or autonomously sending, using the SAGE, the one or more first web portal messages containing the one or more first messages to an agent account, via the web portal, that is accessible by the agent of the service provider; and/or the like.

In some embodiments, autonomously analyzing the first data to identify any issues with provisioning the one or more first services to the at least one first customer may comprise at least one of continually, periodically, randomly, or reactively monitoring second data to identify any new issues with provisioning the one or more first services to the at least one first customer, wherein the second data comprises at least one of the first data, historical data associated with provisioning the one or more first services to the at least one first customer, or updated data associated with provisioning the one or more first services to the at least one first customer.

In some instances, reactively monitoring the second data may comprise monitoring the second data in response to one or more trigger events, wherein the one or more trigger events may comprise at least one of: a determined change in data associated with provisioning the one or more first services, a request to change at least one configuration of one or more nodes for provisioning the one or more first services, a request to change at least one setting of the one or more nodes for provisioning the one or more first services, a request to change at least one configuration of a network profile associated with the at least one first customer, a request to change at least one setting of the network profile associated with the at least one first customer, a determined change in at least one configuration of the one or more nodes for provisioning the one or more first services, a determined change in at least one setting of the one or more nodes for provisioning the one or more first services, a determined change in at least one configuration of the network profile associated with the at least one first customer, or a determined change in at least one setting of the network profile associated with the at least one first customer, and/or the like.

According to some embodiments, autonomously analyzing the first data to identify any issues with provisioning the one or more first services and autonomously identifying the one or more first automation actions from the plurality of automation actions may each be performed using at least one of a machine learning ("ML") system, a deep learning ("DL") system, or an artificial intelligence ("AI") system, and/or the like.

In some embodiments, the method may further comprise: analyzing, using the SAGE, at least one of information regarding provisioning the one or more first services, information regarding the one or more first services, information regarding a customer account of the at least one first customer, or a generated transcript of current and previous communications between the at least one first customer and a call center user; and generating and presenting, using the SAGE, one or more guidance messages to the call center user to guide interaction between the at least one first customer and the call center user, based on the analysis.

In another aspect, a service action guidance engine ("SAGE") might comprise at least one processor and a non-transitory computer readable medium communicatively coupled to the at least one processor. The non-transitory computer readable medium might have stored thereon computer software comprising a set of instructions that, when executed by the at least one processor, causes the SAGE to: autonomously analyze first data to identify any issues with provisioning one or more first services, among a plurality of services, to at least one first customer of a service provider; autonomously identify one or more first automation actions from a plurality of automation actions to address at least one first issue identified based on the analysis; and autonomously send one or more first instructions to one or more first automation bots, among a plurality of automation bots, to perform the identified one or more first automation actions.

According to some embodiments, the SAGE may comprise at least one of a service diagnostics computing system, a service provisioning computing system, a service management computing system, a call center computing system, a machine learning ("ML") system, a deep learning ("DL") system, an artificial intelligence ("AI") system, a network operations center ("NOC") computing system, a server computer, a webserver, a cloud computing system, or a distributed computing system, and/or the like.

In yet another aspect, a system might comprise a computing system, which might comprise at least one first processor and a first non-transitory computer readable medium communicatively coupled to the at least one first processor. The first non-transitory computer readable medium might have stored thereon computer software comprising a first set of instructions that, when executed by the at least one first processor, causes the computing system to: autonomously analyze first data to identify any issues with provisioning one or more first services, among a plurality of services, to at least one first customer of a service provider; autonomously identify one or more first automation actions from a plurality of automation actions to address at least one first issue identified based on the analysis; and autonomously send one or more first instructions to one or more first automation bots, among a plurality of automation bots, to perform the identified one or more first automation actions.

In some embodiments, the computing system may comprise at least one of a service action guidance engine ("SAGE"), a service diagnostics computing system, a service provisioning computing system, a service management computing system, a call center computing system, a machine learning ("ML") system, a deep learning ("DL") system, an artificial intelligence ("AI") system, a network operations center ("NOC") computing system, a server computer, a webserver, a cloud computing system, or a distributed computing system, and/or the like.

Various modifications and additions can be made to the embodiments discussed without departing from the scope of the invention. For example, while the embodiments described above refer to particular features, the scope of this invention also includes embodiments having different combination of features and embodiments that do not include all of the above described features.

SPECIFIC EXEMPLARY EMBODIMENTS

We now turn to the embodiments as illustrated by the drawings. FIGS. 1-6 illustrate some of the features of the method, system, and apparatus for implementing service diagnostics and provisioning, and, more particularly, to methods, systems, and apparatuses for implementing service diagnostics and provisioning via a service action guidance engine ("SAGE"), as referred to above. The methods, systems, and apparatuses illustrated by FIGS. 1-6 refer to examples of different embodiments that include various components and steps, which can be considered alternatives or which can be used in conjunction with one another in the various embodiments. The description of the illustrated methods, systems, and apparatuses shown in FIGS. 1-6 is provided for purposes of illustration and should not be considered to limit the scope of the different embodiments.

With reference to the figures, FIG. 1 is a schematic diagram illustrating a system 100 for implementing service diagnostics and provisioning via a service action guidance engine ("SAGE"), in accordance with various embodiments.

In the non-limiting embodiment of FIG. 1, system 100 might comprise an automated services platform 105a and a data store or database 110a that is local to the automated services platform 105a. In some cases, the database 110a might be external, yet communicatively coupled, to the automated services platform 105a. In other cases, the database 110a might be integrated within the automated services platform 105a. System 100 may further comprise one or more user terminals 115a-115n (collectively, "user terminals 115" or the like) that are operated by corresponding one or more users 120a-120n (collectively, "users 120" or the like). System 100 may further comprise a service action guidance engine ("SAGE") 125a. The automated services platform 105a and corresponding database(s) 110a, as well as user terminals 115a-115n and SAGE 125a may be disposed at call center 130, which may be a facility in which a service provider assembles a number of users 120 (also referred to as, "call center agents," "agents," "customer service representatives," or "representatives," or the like). Alternatively, or additionally, at least some of the user terminals 115 and users 120 may be networked together through the call center 130 (e.g., via virtual private networks ("VPNs"), or the like), without having to be physically present within the physical building(s) or campus(es) of the call center 130 (e.g., for telecommuting, teleworking, or remote working, etc.). Alternative to users 120 being call center agents or the like, at least some users 120 may include, without limitation, a field technician associated with the service provider or the at least one first customer, and/or the like.

According to some embodiments, SAGE 125a or 125b may include, without limitation, at least one of a service diagnostics computing system, a service provisioning computing system, a service management computing system, a call center computing system, a machine learning ("ML") system, a deep learning ("DL") system, an artificial intelligence ("AI") system, a network operations center ("NOC") computing system, a server computer, a webserver, a cloud computing system, or a distributed computing system, and/or the like.

In some embodiments, system 100 may further comprise one or more customer premises equipment ("CPE") 135a-135n (collectively, "CPE 135" or the like) and one or more user devices 140a-140n (collectively, "user devices 140" or the like) that are disposed at corresponding customer premises 145a-145n (collectively, "customer premises 145" or the like), each associated with a customer among a plurality of customers 150a-150n (collectively, "customers 150" or the like). System 100 may further comprise a plurality of nodes 155a-155n and/or 160a-160n (collectively, "nodes 155," "nodes 160," "nodes 155-160," or the like), which may be disposed within networks 165a-165n (collectively, "networks 165" or the like) that are operated (and in some cases also owned) by the service provider. In some instances, system 100 may further comprise a plurality of data sources 170a-170n and/or 175a-175n (collectively, "data sources 170," "data sources 175," "data sources 170-175," or the like), a plurality of automation bots 180a-180n (collectively, "automation bots 180" or the like), and orchestration system 185, each of which may be disposed within networks 165a-165n.

According to some embodiments, the automated services platform 105a may include, without limitation, at least one of a service diagnostics computing system, a service provisioning computing system, a service management computing system, or a call center computing system, and/or the like. Alternative or additional to the automated services platform 105a and corresponding database 110a being disposed within call center 130, system 100 might comprise remote automated services platform 105b and corresponding database(s) 110b that communicatively couple with the one or more user terminals 115a-115n at call center 130 via the network(s) 165 and via at least one node 155 or 160. In some embodiments, remote automated services platform 105b might comprise at least one of a server computer, a webserver, a cloud computing system, or a distributed computing system, and/or the like. In some cases, the user terminals may each include, but is not limited to, at least one of a telephone, a headset, a desktop computer, a laptop computer, or a tablet computer, and/or the like. In some instances, the user devices 140 might each include, without limitation, one of a laptop computer, a tablet computer, a smart phone, a mobile phone, or a residential or office telephone, and/or the like. In some cases, customer premises 145, which might each include one of a single family house, a multi-dwelling unit ("MDU") within a multi-dwelling complex (including, but not limited to, an apartment building, an apartment complex, a condominium complex, a townhouse complex, a mixed-use building, etc.), a motel, an inn, a hotel, an office building or complex, a commercial building or complex, or an industrial building or complex, and/or the like.

Figure 2:
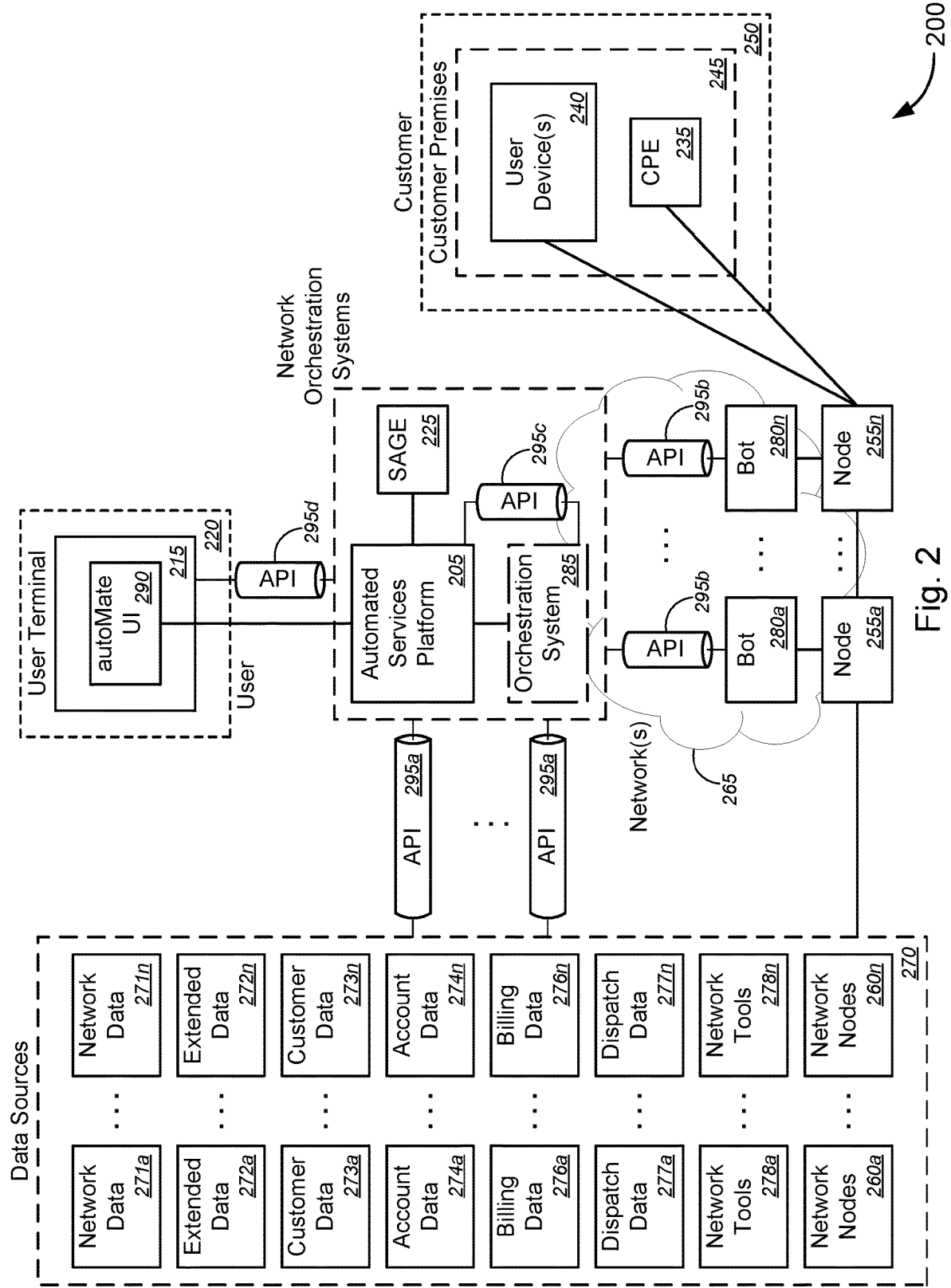
FIG. 2 is a schematic diagram illustrating a non-limiting example of use of application programming interfaces ("APIs") for implementing service diagnostics and provisioning via SAGE, in accordance with various embodiments.

Merely by way of example, in some cases, the plurality of data sources 170-175 may include, without limitation, at least one of one or more network data sources, one or more network extended data sources, one or more customer data sources, one or more customer account data sources, one or more billing data sources, one or more dispatch data sources, one or more network tools, or one or more nodes disposed in at least one network via which at least one service among the plurality of services is provisioned, and/or the like (such as shown, e.g., in FIG. 2, or the like).

In some embodiments, networks 165 may each include, without limitation, one of a local area network ("LAN"), including, without limitation, a fiber network, an Ethernet network, a Token-Ring™ network, and/or the like; a wide-area network ("WAN"); a wireless wide area network ("WWAN"); a virtual network, such as a virtual private network ("VPN"); the Internet; an intranet; an extranet; a public switched telephone network ("PSTN"); an infra-red network; a wireless network, including, without limitation, a network operating under any of the IEEE 802.11 suite of protocols, the Bluetooth™ protocol known in the art, and/or any other wireless protocol; and/or any combination of these and/or other networks. In a particular embodiment, the network(s) 165 may include an access network of the service provider (e.g., an Internet service provider ("ISP")). In another embodiment, the network(s) 165 may include a core network of the service provider and/or the Internet.

In operation, SAGE 125a and/or 125b (collectively, "service action guidance engine," or "SAGE," or the like) may receive first data from at least one of an automated services platform (e.g., automated services platform 105a or 105b, or the like) or one or more data sources (e.g., data sources 170a-170n and/or 175a-175n, or the like). SAGE may autonomously analyze the first data to identify any issues with provisioning one or more first services, among a plurality of services, to at least one first customer (e.g., customer 150a, or the like) of a service provider. In some cases, autonomously analyzing the first data to identify any issues with provisioning the one or more first services to the at least one first customer may comprise at least one of continually, periodically, randomly, or reactively monitoring second data to identify any new issues with provisioning the one or more first services to the at least one first customer.

In some instances, the second data may include, without limitation, at least one of the first data, historical data associated with provisioning the one or more first services to the at least one first customer, or updated data associated with provisioning the one or more first services to the at least one first customer, and/or the like. In some cases, reactively monitoring the second data may comprise monitoring the second data in response to one or more trigger events. In some embodiments, the one or more trigger events may include, but are not limited to, at least one of a determined change in data associated with provisioning the one or more first services, a request to change at least one configuration of one or more nodes for provisioning the one or more first services, a request to change at least one setting of the one or more nodes for provisioning the one or more first services, a request to change at least one configuration of a network profile associated with the at least one first customer, a request to change at least one setting of the network profile associated with the at least one first customer, a determined change in at least one configuration of the one or more nodes for provisioning the one or more first services, a determined change in at least one setting of the one or more nodes for provisioning the one or more first services, a determined change in at least one configuration of the network profile associated with the at least one first customer, or a determined change in at least one setting of the network profile associated with the at least one first customer, and/or the like.

In some embodiments, SAGE may autonomously identify one or more first automation actions from a plurality of automation actions to address at least one first issue identified based on the analysis, and may autonomously send one or more first instructions to one or more first automation bots, among a plurality of automation bots (e.g., automation bots 180a-180n, or the like), to perform the identified one or more first automation actions. In some instances, information regarding the plurality of automation actions may be contained within a library of automation actions that are stored in a database (e.g., database(s) 110a or 110b, or the like), where autonomously identifying the one or more first automation actions to address the determined at least one first issue may comprise SAGE autonomously identifying the one or more first automation actions from the plurality of automation actions contained within the library of automation actions that are stored in the database, to address the at least one first issue.

According to some embodiments, autonomously analyzing the first data to identify any issues with provisioning the one or more first services and autonomously identifying the one or more first automation actions from the plurality of automation actions may each be performed using at least one of a machine learning ("ML") system, a deep learning ("DL") system, or an artificial intelligence ("AI") system, and/or the like.

In some embodiments, the first data may be collected by an automated services platform from each of one or more first data sources among a plurality of data sources by collecting the first data from each data source containing data directly associated with provisioning the one or more first services to the at least one first customer and from each data source containing data indirectly associated with provisioning the one or more first services. In some cases, the data indirectly associated with provisioning the one or more first services may include, but is not limited to, at least one of data retrieved from an outage reporting system that collects outage data associated with provisioning the one or more first services, data associated with provisioning the one or more first services that has been posted via an application programming interface ("API") call by the outage reporting system, data associated with other customers in proximity to the at least one first customer, data associated with network nodes along potential network paths configured to provision the one or more first services, or data associated with services unassociated with the one or more first services yet indicative of geographical events, natural events, or events caused by humans that are determined to have a non-zero probability of affecting provisioning of the one or more first services to the at least one first customer, and/or the like.

In some cases, the automated services platform may manage connections, and may communicate, with each of the plurality of data sources (e.g., data sources 170-175, or the like) and with each of the plurality of automation bots (e.g., automation bots 180, or the like), the plurality of data sources and the plurality of automation bots being disposed within one or more networks (e.g., network(s) 165*a*-165*n*, or the like) providing the one or more first services. In some instances, managing connections, and communicating, with each of the plurality of data sources may be performed via a first API between the automated services platform and each of the plurality of data sources, and managing connections, and communicating, with each of the plurality of automation bots may be performed via a second API between the automated services platform and each of the plurality of automation bots.

Alternatively, collecting first data from each of the plurality of data sources may comprise collecting data from each of the plurality of data sources via an orchestration system (e.g., orchestration system 185, or the like), where autonomously sending the one or more first instructions to the one or more first automation bots may comprise autonomously sending the one or more first instructions to the one or more first automation bots via the orchestration system. In such cases, the first API may communicatively couple the orchestration system with each of the plurality of data sources, and the second API may communicatively couple the orchestration system with each of the plurality of automation bots, while a third API may communicatively couple the orchestration system with the automated services platform, and a fourth API may communicatively couple the automated services platform with the user terminal.

Merely by way of example, in some cases, the one or more first automation bots may include, but are not limited to, one of: the one or more first data sources, among the plurality of data sources, that collect the first data that is indicative of the at least one first issue; one or more second automation bots that are separate from the one or more first data sources that collect the first data, where the one or more second automation bots are identified subsequent to identifying the one or more first automation actions based on its capability of performing the identified one or more first automation actions; or one or more third automation bots that are separate from the one or more first data sources that collect the first data, where the one or more third automation bots are selected for performing the identified one or more first automation actions based on proximity to at least one of a source of the at least one first issue or a determined location for implementing the identified one or more first automation actions; and/or the like.

In some embodiments, the first data may include data associated with provisioning services to all customers of the service provider. In such cases, SAGE may autonomously analyze the first data to identify at least one of any common issues, any related issues, or any widespread issues, and/or the like, with provisioning services, among the plurality of services, to a plurality of second customers of the service provider. Based on a determination that at least one second issue affects provisioning of at least one second service among the one or more second services, SAGE may autonomously identify one or more second automation actions to address the determined at least one second issue, and may autonomously send one or more second instructions to one or more second automation bots, among the plurality of automation bots, to perform the identified one or more second automation actions.

According to some embodiments, based on a determination that the one or more first automation bots have successfully resolved the at least one first issue via the identified one or more first automation actions and based on a determination that dispatch records of the service provider indicate that a field technician has already been dispatched to address the at least one first issue, SAGE may autonomously send one or more third instructions cancelling the dispatchment of the field technician to address the at least one first issue. SAGE, in some cases, may also autonomously send one or more first messages indicating that the at least one first issue has been resolved.

Merely by way of example, in some cases, autonomously sending the one or more first messages indicating that the at least one first issue has been resolved may include, but is not limited to, at least one of: (a) SAGE autonomously pushing one or more first notifications containing the one or more first messages to at least one user device associated with the at least one first customer; (b) SAGE autonomously sending at least one of one or more first e-mail messages, one or more first text messages, one or more first multimedia messaging service ("MMS") messages, and/or the like, each containing the one or more first messages, to the at least one user device associated with the at least one first customer; (c) SAGE autonomously sending one or more first web portal messages containing the one or more first messages to a user account, via a web portal, that is accessible by the at least one first customer; (d) SAGE autonomously pushing the one or more first notifications containing the one or more first messages to at least one user terminal associated with an agent of the service provider; (e) SAGE autonomously sending at least one of the one or more first e-mail messages, the one or more first text messages, the one or more first MMS messages, and/or the like, each containing the one or more first messages, to the at least one user terminal associated with the agent of the service provider; or (f) SAGE autonomously sending the one or more first web portal messages containing the one or more first messages to an agent account, via the web portal, that is accessible by the agent of the service provider; and/or the like.

In some embodiments, SAGE may analyze at least one of information regarding provisioning the one or more first services, information regarding the one or more first services, information regarding a customer account of the at least one first customer, or a generated transcript of current and previous communications between the at least one first customer and a call center user, and/or the like. SAGE may then generate and present one or more guidance messages to the call center user to guide interaction between the at least one first customer and the call center user, based on the analysis.

In some aspects, SAGE may also perform functionalities of the Auto Switch system, the Provisioning Tool system, and the AutoMate system, as well as functionalities performed by the call center users or agents described therein. The Auto Switch system is as described in detail in U.S. patent application Ser. No. 17/491,013 (the "'1628 Application"), filed Sep. 30, 2021, by Jaime Lemley et al., entitled, "Auto Switch—Call Center-Based Automated Interface with Voice Switches for Voice Service Diagnostics and Provisioning," which claims priority to U.S. Patent Application Ser. No. 63/226,519 (the "'519 Application"), filed Jul. 28, 2021, by Jaime Lemley et al., entitled, "Auto Switch—Call Center-Based Automated Interface with Voice Switches for Voice Service Diagnostics and Provisioning," while the Provisioning Tool Application is as described in detail in U.S. patent application Ser. No. 17/491,186 (the "'1629 Application"), filed Sep. 30, 2021, by Jaime Lemley et al., entitled, "Provisioning Tool—Call Center-Based Automated Interface with Network Switches for Internet Service Diagnostics and Provisioning," which claims priority to U.S. Patent Application Ser. No. 63/227,224 (the "'224 Application"), filed Jul. 29, 2021, by Jaime Lemley et al., entitled, "Provisioning Tool—Call Center-Based Automated Interface with Network Switches for Internet Service Diagnostics and Provisioning," and the AutoMate system is as described in detail in U.S. patent application Ser. No. 17/491,196 (the "'1630 Application"), filed Sep. 30, 2021, by Jaime Lemley et al., entitled, "AutoMate—Automated Interface Between Call Center Agents and Network Orchestration Systems via Application Programming Interfaces (APIs)," which claims priority to U.S. Patent Application Ser. No. 63/231,583 (the "'583 Application"), filed Aug. 10, 2021, by Jaime Lemley et al., entitled, "AutoMate—Automated Interface Between Call Center Agents and Network Orchestration Systems via Application Programming Interfaces (APIs)," the disclosure of each of which is incorporated herein by reference in its entirety for all purposes.

In some embodiments, SAGE autonomously performs functionalities in the background without human instruction, while autonomously analyzing data (such as data from any one or more of the various types of data sources as described herein with respect to the various non-limiting embodiments of FIGS. 1-4, or the like) on a continual, periodic, random, or reactive manner, and/or the like, to identify issues with provisioning of services to customers and to identify autonomous actions for autonomous bots to take to resolve any identified issues. In this manner, a customer need not have to initiate service issue resolution by calling the service provider's call center, as the system automatically analyzes the data to anticipate issues that may affect one or more customers, and autonomously controls autonomous bots to perform autonomous actions to address said issues. Alternatively, or additionally, SAGE guides interactions between customers and call center agents based on analyses of similar data.

These and other functions of the system 100 (and its components) are described in greater detail below with respect to FIGS. 2-4.

FIG. 2 is a schematic diagram illustrating a non-limiting example 200 of use of application programming interfaces ("APIs") for implementing service diagnostics and provisioning via SAGE, in accordance with various embodiments.

With reference to the non-limiting example of FIG. 2, system 200 may comprise automated services platform 205 and user terminal 215 that is associated with, or operated by, user 220. System 200 may further comprise customer premises equipment ("CPE") 235 and user device(s) 240 disposed within customer premises 245 associated with customer 250. In the case that the user 220 is a call center user or agent, the automated services platform 205 and user terminal 215 may, in some cases, be disposed within a call center (e.g., call center 130 of FIG. 1, or the like) or accessed via the call center (e.g., in a telecommuting, teleworking, or remote working setup, etc.). Alternatively, in the case that the user 220 is a field technician associated with the service provider, the user terminal 215 may be a portable device that is brought from one location to another where the field technician may be dispatched to resolve any issues with provisioning of at least one service provided by the service provider to at least one customer. In another alternative embodiment, in the case that the user 220 is a customer (e.g., customer 250, or the like) of the service provider, the user terminal 215 may comprise one of the user devices 240 that are disposed in customer premises 245 or a portable user device (not shown) that is disposed outside customer premises 245.

System 200 may further comprise one or more nodes 255a-255n (collectively, "nodes 255" or the like), one or more automation bots 280a-280n (collectively, "automation bots 280" or "bots 280" or the like), and orchestration system 285 that may be disposed within network(s) 265. In some cases, system 200 may further comprise a plurality of data sources 270 and a service action guidance engine ("SAGE") 225, each of which may be disposed in network(s) 265 (not shown) or outside network(s) 265, or the like. Automated services platform 205, SAGE 225, and orchestration system 285 are collectively referred to herein as "network orchestration systems."

Merely by way of example, in some cases, the plurality of data sources 270 may include, but are not limited to, one or more network data sources 271a-271n (collectively, "network data sources 271" or "data sources 271 containing network data," or the like), one or more network extended data sources 272a-272n (collectively, "network extended data sources 272" or "data sources 272 containing network extended data," or the like), one or more customer data sources 273a-273n (collectively, "customer data sources 273" or "data sources 273 containing customer data," or the like), one or more customer account data sources 274a-274n (collectively, "customer account data sources 274" or "data sources 274 containing customer account data," or the like), one or more billing data sources 276a-276n (collectively, "billing data sources 276" or "data sources 276 containing billing data," or the like), one or more dispatch data sources 277a-277n (collectively, "dispatch data sources 277" or "data sources 277 containing dispatch data," or the like), one or more network tools 278a-278n (collectively, "network tools 278" or "data sources 278 containing network tools," or the like), or one or more nodes 260a-260n (collectively, "network nodes 260" or "data sources 260," or the like) disposed in at least one network via which at least one service among the plurality of services is provisioned, and/or the like.

According to some embodiments, the network data may include, without limitation, at least one of data collected from or associated with the Auto Switch system (as described in the '1628 Application, which has been incorporated herein by reference in its entirety for all purposes), data collected from or associated with one or more broadband remote access servers ("BRASs"), data regarding network congestion, data collected from or associated with at least one network aggregator (such as described in the '1629 Application, which has also been incorporated herein by reference in its entirety for all purposes), data collected from or associated with the Provisioning Tool system (as described in the '1629 Application), or data collected from or associated with at least one remote authentication dial-in user service ("RADIUS") server, and/or the like. In some instances, the network extended data may include, but is not limited to, at least one of data collected from or associated with at least one access control server ("ACS"; which is an authentication, authorization, and accounting platform that allows users to centrally manage access to network resources for a variety of access types, devices, and user groups, while authenticating and authorizing wireless users and hosts, and enforcing wireless policies, etc.), data collected from or associated with at least one Internet connection diagnostic system (e.g., CloudCheck® by Adaptive Spectrum and Signal Alignment, Inc. or ASSIA, etc.; which is an app-based system that enables users to identify the cause of Internet connection slow-downs, or the like), or data collected from or associated with at least one anti-virus software, and/or the like.

In some embodiments, the customer data may include, without limitation, at least one of data collected by services that monitor consumer response to commercial services and products, data collected by services that monitor Internet forums, data collected by services that monitor online blogs, data collected by services that monitor social networks, or data collected by customer engagement systems (e.g., interactive voice response ("IVR") systems or AI-driven customer engagement engines (e.g., ContactEngine®, etc.), or the like) that monitor interactions with customers, and/or the like. In some instances, the customer account data may include, but is not limited to, customer account data for third-party services with which the service provider has partnered (e.g., third-party project management services, third-party location assistance information services, third-party web portal services, third-party cloud identification authentication services, third-party search and discovery metadata platform services, third-party e-mail services, third-party logistics and supply chain services, or third-party online real estate marketplace services, etc.), or the like. In some cases, the billing data may include, without limitation, at least one of data collected or managed by customer care, billing, and/or order management systems, or data collected or managed by customer notification and ordering platforms, and/or the like.

In some instances, the dispatch data may include, but is not limited to, at least one of data collected or managed by work and force administration ("WFA") systems (e.g., WFA dispatch in ("WFA/DI") systems that automate work assignments to technicians who work inside central offices to install and maintain telephone and/or network services, etc.; WFA dispatch out ("WFA/DO") systems that automate work assignments to technicians who work outside central offices to install and maintain telephone and/or network services, etc.; or the like), data collected or managed by public safety data collection and reporting tools used by public safety professionals for traffic and non-traffic related cases, or data collected or managed by computer-aided dispatch, central communications, and/or mapping software platforms used by public safety professionals, and/or the like. In some embodiments, other data collected or managed by the data sources may include, without limitation, at least one of data collected or managed by a platform (e.g., Customer 360 platform, or the like) that captures a holistic view of all information associated with the customer that is also associated with services provided by the customer (such as described in U.S. application Ser. No. 16/366,978 by Gurpreet Sidhu, which is incorporated herein by reference in its entirety for all purposes), data collected or managed by a platform (e.g., a distributed wireless ordering protocol ("DWOP") system, or the like) that provides reference scheduling service order in wireless ad hoc networks via information sharing, or the like, or data regarding operators that are contained in libraries (e.g., Rx Microservices, etc.) that allow the system to build reactive client-side and server-side applications to handle events asynchronously in a manner that maximizes responsiveness, resiliency, and elasticity, and/or the like.

Referring back to FIG. 2, UI 290 may be presented on user terminal 215 and may display information regarding at least one of any identified issues, any services affected by each of the identified issues, one or more automation actions that are identified for addressing each of the identified issues, or one or more automation bots (e.g., among the automation bots 280a-280n, or the like) for performing the one or more automation actions, and/or the like.

The automated services platform 205, the user terminal 215, the user 220, the SAGE 225, the CPE 235, the user device(s) 240, the customer premises 245, the customer 250, the nodes 255a-255n, the network nodes 260a-260n, the network(s) 265, the data sources 270, the automation bots 280a-280n, the orchestration system 285, and the UI 290 of system 200 in FIG. 2 are otherwise similar, if not identical, to the automated services platform 105a and/or 105b, the user terminals 115a-115n, the users 120a-120n, the SAGE 125a and/or 125b, the CPE 135a-135n, the user device(s) 140a-140n, the customer premises 145a-145n, the customers 150a-150n, the nodes 155a-155n, the nodes 160a-160n, the network(s) 165a-165n, the data sources 170a-170n and 175a-175n, the automation bots 180a-180n, the orchestration system 185, and the UIs 190a-190n, respectively, of system 100 in FIG. 1, and the descriptions of these components of system 100 are applicable to the corresponding components of system 200, respectively.

Further to the embodiments as described above with respect to FIG. 1, managing connections, and communicating, with each of the plurality of data sources may be performed via a first application programming interface ("API") (e.g., API 295a, or the like) between the automated services platform (e.g., automated services platform 205, or the like) or the (intermediary) orchestration system (e.g., orchestration system 285, or the like) and each of the data sources (e.g., data sources 260a-260n, 270, 271a-271n, 272a-272n, 273a-273n, 274a-274n, 276a-276n, 277a-277n, and 278a-278n, or the like). Likewise, managing connections, and communicating, with each of the plurality of automation bots may be performed via a second API (e.g., API 295b, or the like) between the automated services platform (e.g., automated services platform 205, or the like) or the (intermediary) orchestration system (e.g., orchestration system 285, or the like) and each of the plurality of automation bots (e.g., automation bots 280a-280n, or the like). In the case that the orchestration system is used as an intermediary between the automated service platform and each data source and/or each automation bot, a third API (e.g., API 295c, or the like) may communicatively couple the orchestration system (e.g., orchestration system 285, or the like) with the automated services platform (e.g., automated services platform 205, or the like). In any event, a fourth API (e.g., API 295d) may communicatively couple the automated services platform (e.g., automated services platform 205, or the like) with the user terminal (e.g., user terminal 215, or the like). In this manner, the automated services platform serves as a platform that is interactive for the end-user and that manages connections and communications with automations or automation bots, thereby creating a bridge between the numerous automations or automation bots and the end-user. The automated services functionality is exposed to the end-user via a single API (in this case, fourth API 295d, or the like) that controls all of the automation functions.

Figure 3:
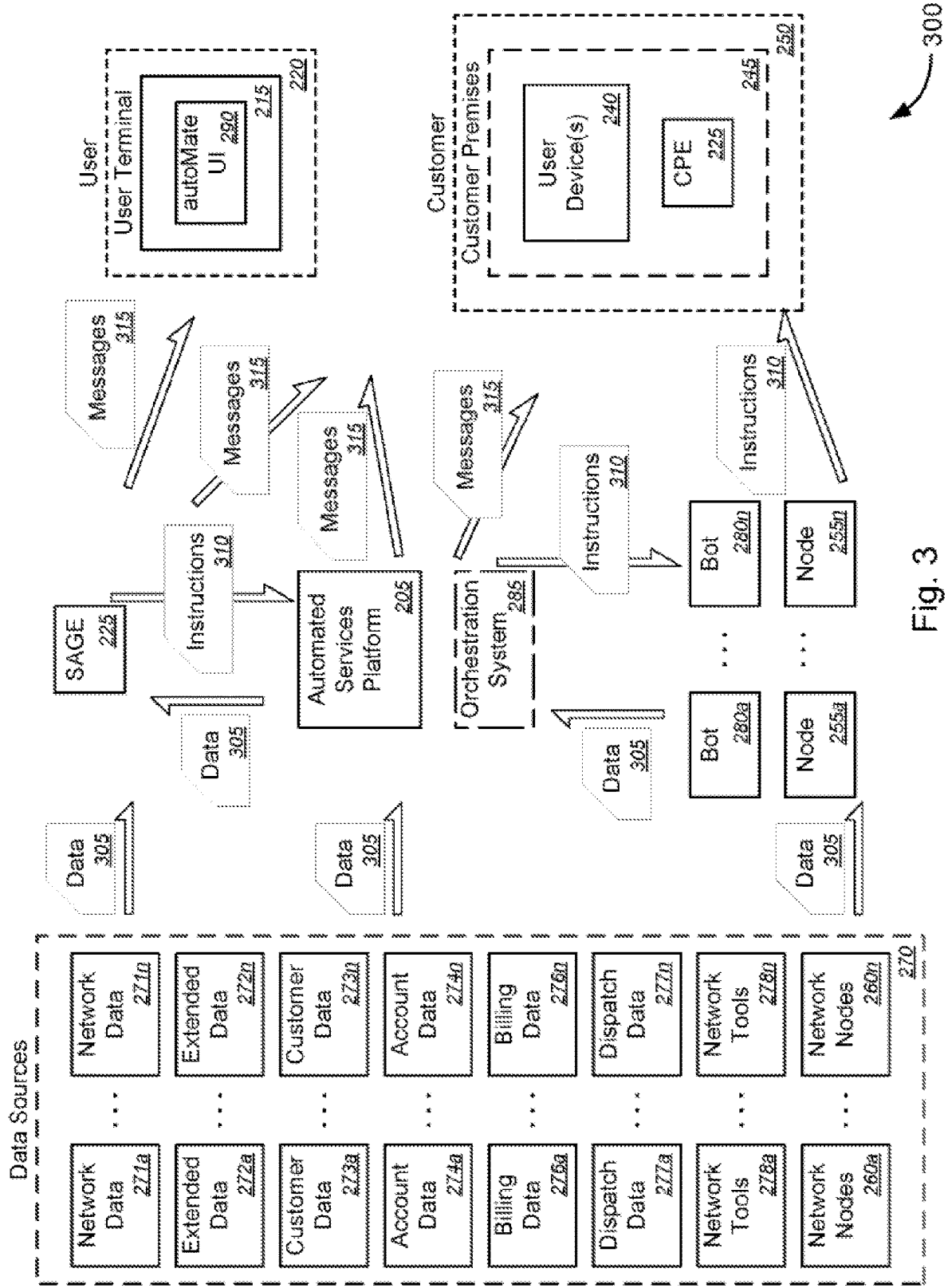
FIG. 3 is a schematic diagram illustrating a non-limiting example of data communications for implementing service diagnostics and provisioning via SAGE, in accordance with various embodiments.

FIG. 3 is a schematic diagram illustrating a non-limiting example 300 of data communications for implementing service diagnostics and provisioning via SAGE, in accordance with various embodiments.

The automated services platform 205, the user terminal 215, the user 220, the SAGE 225, the CPE 235, the user device(s) 240, the customer premises 245, the customer 250, the nodes 255a-255n, the network nodes 260a-260n, the data sources 270, the automation bots 280a-280n, the orchestration system 285, and the UI 290 of system 300 in FIG. 3 are otherwise similar, if not identical, to the automated services platform 205, the user terminal 215, the user 220, the SAGE 225, the CPE 235, the user device(s) 240, the customer premises 245, the customer 250, the nodes 255a-255n, the network nodes 260a-260n, the data sources 270, the automation bots 280a-280n, the orchestration system 285, and the UI 290 of system 200 in FIG. 2, respectively, and the descriptions of these components of system 200 (and corresponding components of system 100 of FIG. 1) are applicable to the corresponding components of system 300, respectively.

With reference to FIG. 3, SAGE 225 may receive data 305 from data sources 270 and/or from automated services platform 205, in some cases, via one or more of orchestration system 285, automation bots 280a-280n, and/or nodes 255a-255n, and/or the like. SAGE 225 may autonomously analyze data 305 to identify any issues with provisioning one or more first services, among a plurality of services, to at least one first customer (e.g., customer 250, or the like) of a service provider, may autonomously identify one or more first automation actions from a plurality of automation actions to address at least one first issue identified based on the analysis, and may autonomously send one or more first instructions 310 to one or more first automation bots, among a plurality of automation bots (e.g., automation bots 280a-280b, or the like), to perform the identified one or more first automation actions.

In some embodiments, SAGE 225 may autonomously send messages 315 to a call center agent or user (e.g., user 220, or the like), a field technician (not shown), and/or a customer (e.g., customer 250, or the like). The messages 315 may include, without limitation, at least one of one or more messages indicating that the at least one first issue has been resolved, one or more messages cancelling dispatchment of the field technician, one or more messages indicating that the at least one first issue cannot be resolved remotely and that a field technician should be dispatched, or one or more guidance messages to the call center user to guide interaction between a customer and the call center user, and/or the like.

Merely by way of example, in some cases, autonomously sending the one or more messages 315 indicating that the at least one first issue has been resolved may include, but is not limited to, at least one of: (a) SAGE autonomously pushing one or more first notifications containing the one or more first messages to at least one user device (e.g., user device 240, or the like) associated with the at least one first customer (e.g., customer 250, or the like); (b) SAGE autonomously sending at least one of one or more first e-mail messages, one or more first text messages, one or more first multimedia messaging service ("MMS") messages, and/or the like, each containing the one or more first messages, to the at least one user device associated with the at least one first customer; (c) SAGE autonomously sending one or more first web portal messages containing the one or more first messages to a user account, via a web portal, that is accessible by the at least one first customer; (d) SAGE autonomously pushing the one or more first notifications containing the one or more first messages to at least one user terminal (e.g., user terminal 215, or the like) associated with an agent of the service provider (e.g., user 220, or the like); (e) SAGE autonomously sending at least one of the one or more first e-mail messages, the one or more first text messages, the one or more first MMS messages, and/or the like, each containing the one or more first messages, to the at least one user terminal associated with the agent of the service provider; or (f) SAGE autonomously sending the one or more first web portal messages containing the one or more first messages to an agent account, via the web portal, that is accessible by the agent of the service provider; and/or the like.

FIGS. 4A-4E (collectively, "FIG. 4") are flow diagrams illustrating a method 400 for implementing service diagnostics and provisioning via SAGE, in accordance with various embodiments. Method 400 of FIG. 4A continues onto one or more of FIG. 4B following the circular marker denoted, "A," FIG. 4C following the circular marker denoted, "B," and/or FIG. 4E following the circular marker denoted, "C." Method 400 of FIGS. 4B, 4C, and 4E return to FIG. 4A following the circular marker denoted, "D."

While the techniques and procedures are depicted and/or described in a certain order for purposes of illustration, it should be appreciated that certain procedures may be reordered and/or omitted within the scope of various embodiments. Moreover, while the method 400 illustrated by FIG. 4 can be implemented by or with (and, in some cases, are described below with respect to) the systems, examples, or embodiments 100, 200, and 300 of FIGS. 1, 2, and 3, respectively (or components thereof), such methods may also be implemented using any suitable hardware (or software) implementation. Similarly, while each of the systems, examples, or embodiments 100, 200, and 300 of FIGS. 1, 2, and 3, respectively (or components thereof), can operate according to the method 400 illustrated by FIG. 4 (e.g., by executing instructions embodied on a computer readable medium), the systems, examples, or embodiments 100, 200, and 300 of FIGS. 1, 2, and 3 can each also operate according to other modes of operation and/or perform other suitable procedures.

Figure 4A:
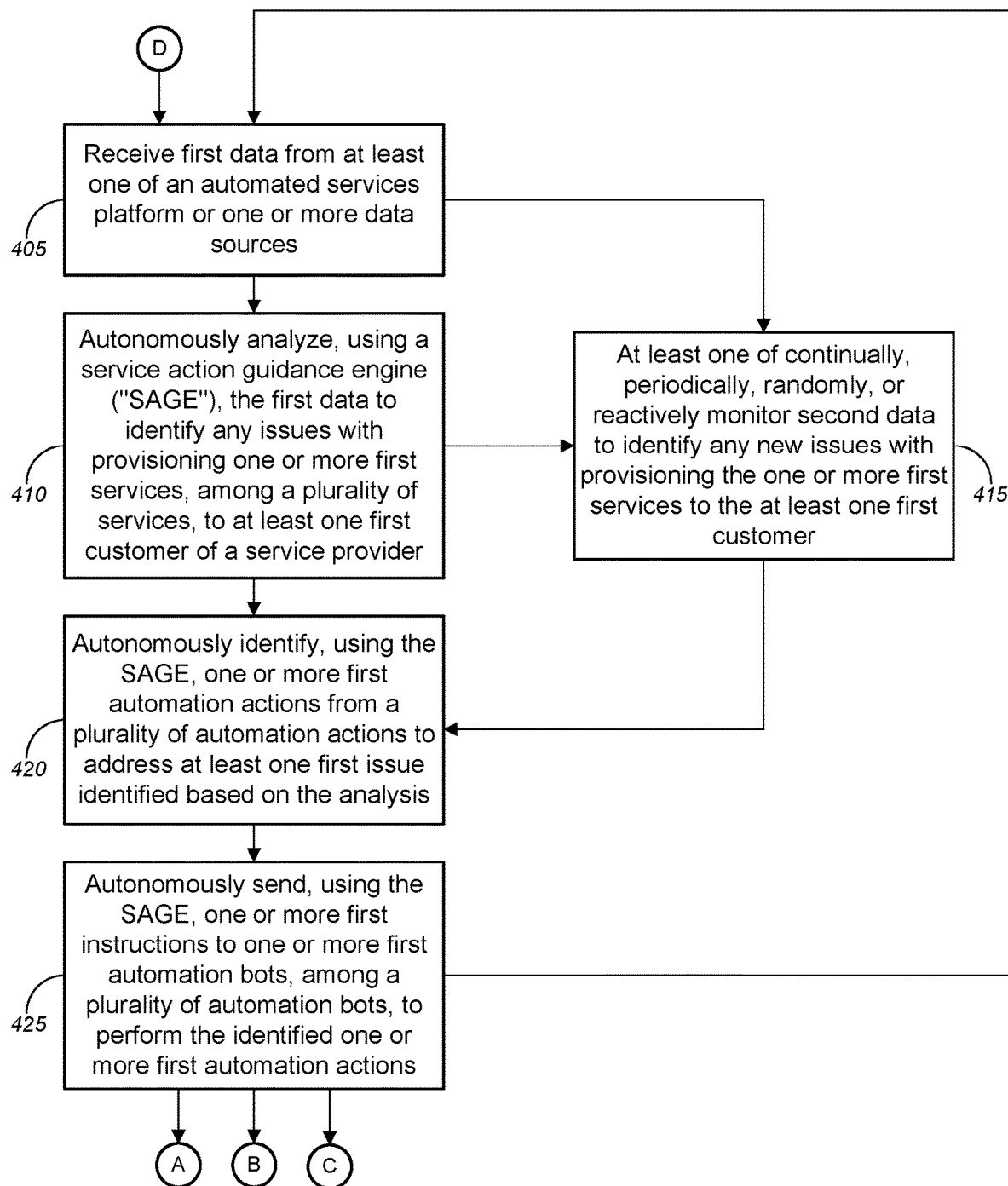
FIGS. 4A-4E are flow diagrams illustrating a method for implementing service diagnostics and provisioning via SAGE, in accordance with various embodiments.

In the non-limiting embodiment of FIG. 4A, method 400, at block 405, may comprise receiving first data from at least one of an automated services platform or one or more data sources. At block 410, method 400 may comprise autonomously analyzing, using a service action guidance engine ("SAGE"), the first data to identify any issues with provisioning one or more first services, among a plurality of services, to at least one first customer of a service provider. In some cases, autonomously analyzing the first data to identify any issues with provisioning the one or more first services to the at least one first customer (at block 410) may comprise at least one of continually, periodically, randomly, or reactively monitoring second data to identify any new issues with provisioning the one or more first services to the at least one first customer (block 415).

In some instances, the second data may include, without limitation, at least one of the first data, historical data associated with provisioning the one or more first services to the at least one first customer, or updated data associated with provisioning the one or more first services to the at least one first customer, and/or the like. In some cases, reactively monitoring the second data may comprise monitoring the second data in response to one or more trigger events. In some embodiments, the one or more trigger events may include, but are not limited to, at least one of a determined change in data associated with provisioning the one or more first services, a request to change at least one configuration of one or more nodes for provisioning the one or more first services, a request to change at least one setting of the one or more nodes for provisioning the one or more first services, a request to change at least one configuration of a network profile associated with the at least one first customer, a request to change at least one setting of the network profile associated with the at least one first customer, a determined change in at least one configuration of the one or more nodes for provisioning the one or more first services, a determined change in at least one setting of the one or more nodes for provisioning the one or more first services, a determined change in at least one configuration of the network profile associated with the at least one first customer, or a determined change in at least one setting of the network profile associated with the at least one first customer, and/or the like.

According to some embodiments, the SAGE may include, without limitation, at least one of a service diagnostics computing system, a service provisioning computing system, a service management computing system, a call center computing system, a machine learning ("ML") system, a deep learning ("DL") system, an artificial intelligence ("AI") system, a network operations center ("NOC") computing system, a server computer, a webserver, a cloud computing system, or a distributed computing system, and/or the like.

In some embodiments, method 400 may further comprise autonomously identifying, using the SAGE, one or more first automation actions from a plurality of automation actions to address at least one first issue identified based on the analysis (block 420); and autonomously sending, using the SAGE, one or more first instructions to one or more first automation bots, among a plurality of automation bots, to perform the identified one or more first automation actions (block 425). In some instances, information regarding the plurality of automation actions may be contained within a library of automation actions that are stored in a database, where autonomously identifying the one or more first automation actions to address the determined at least one first issue may comprise autonomously identifying, using the SAGE, the one or more first automation actions from the plurality of automation actions contained within the library of automation actions that are stored in the database, to address the at least one first issue.

According to some embodiments, autonomously analyzing the first data to identify any issues with provisioning the one or more first services and autonomously identifying the one or more first automation actions from the plurality of automation actions may each be performed using at least one of a machine learning ("ML") system, a deep learning ("DL") system, or an artificial intelligence ("AI") system, and/or the like.

In some embodiments, the first data may be collected by an automated services platform from each of one or more first data sources among a plurality of data sources by collecting the first data from each data source containing data directly associated with provisioning the one or more first services to the at least one first customer and from each data source containing data indirectly associated with provisioning the one or more first services. In some cases, the data indirectly associated with provisioning the one or more first services may include, but is not limited to, at least one of data retrieved from an outage reporting system that collects outage data associated with provisioning the one or more first services, data associated with provisioning the one or more first services that has been posted via an application programming interface ("API") call by the outage reporting system, data associated with other customers in proximity to the at least one first customer, data associated with network nodes along potential network paths configured to provision the one or more first services, or data associated with services unassociated with the one or more first services yet indicative of geographical events, natural events, or events caused by humans that are determined to have a non-zero probability of affecting provisioning of the one or more first services to the at least one first customer, and/or the like.

In some instances, the one or more data sources or the plurality of data sources may include, without limitation, at least one of one or more network data sources, one or more network extended data sources, one or more customer data sources, one or more customer account data sources, one or more billing data sources, one or more dispatch data sources, one or more network tools, or one or more nodes disposed in at least one network via which at least one service among the plurality of services is provisioned, and/or the like. In some cases, the automated services platform may manage connections, and may communicate, with each of the plurality of data sources and with each of the plurality of automation bots, the plurality of data sources and the plurality of automation bots being disposed within one or more networks providing the one or more first services. In some instances, managing connections, and communicating, with each of the plurality of data sources may be performed via a first API between the automated services platform and each of the plurality of data sources, and managing connections, and communicating, with each of the plurality of automation bots may be performed via a second API between the automated services platform and each of the plurality of automation bots.

Alternatively, collecting first data from each of the plurality of data sources may comprise collecting data from each of the plurality of data sources via an orchestration system, where autonomously sending the one or more first instructions to the one or more first automation bots may comprise autonomously sending the one or more first instructions to the one or more first automation bots via the orchestration system. In such cases, the first API may communicatively couple the orchestration system with each of the plurality of data sources, and the second API may communicatively couple the orchestration system with each of the plurality of automation bots, while a third API may communicatively couple the orchestration system with the automated services platform, and a fourth API may communicatively couple the automated services platform with the user terminal.

Merely by way of example, in some cases, the one or more first automation bots may include, but are not limited to, one of: the one or more first data sources, among the plurality of data sources, that collect the first data that is indicative of the at least one first issue; one or more second automation bots that are separate from the one or more first data sources that collect the first data, wherein the one or more second automation bots are identified subsequent to identifying the one or more first automation actions based on its capability of performing the identified one or more first automation actions; or one or more third automation bots that are separate from the one or more first data sources that collect the first data, wherein the one or more third automation bots are selected for performing the identified one or more first automation actions based on proximity to at least one of a source of the at least one first issue or a determined location for implementing the identified one or more first automation actions; and/or the like.

Figures 4B, 4C:
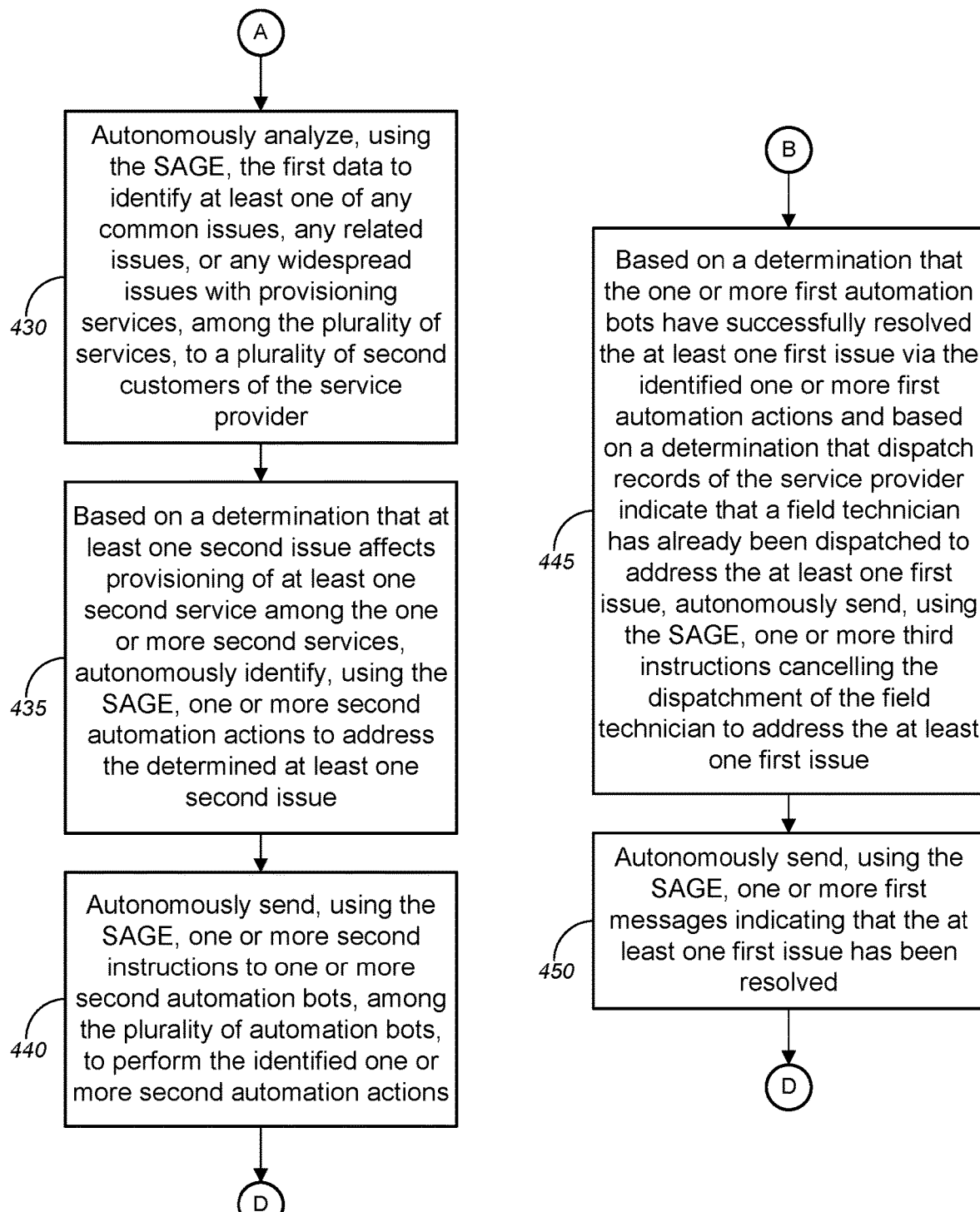
Figure 4D:
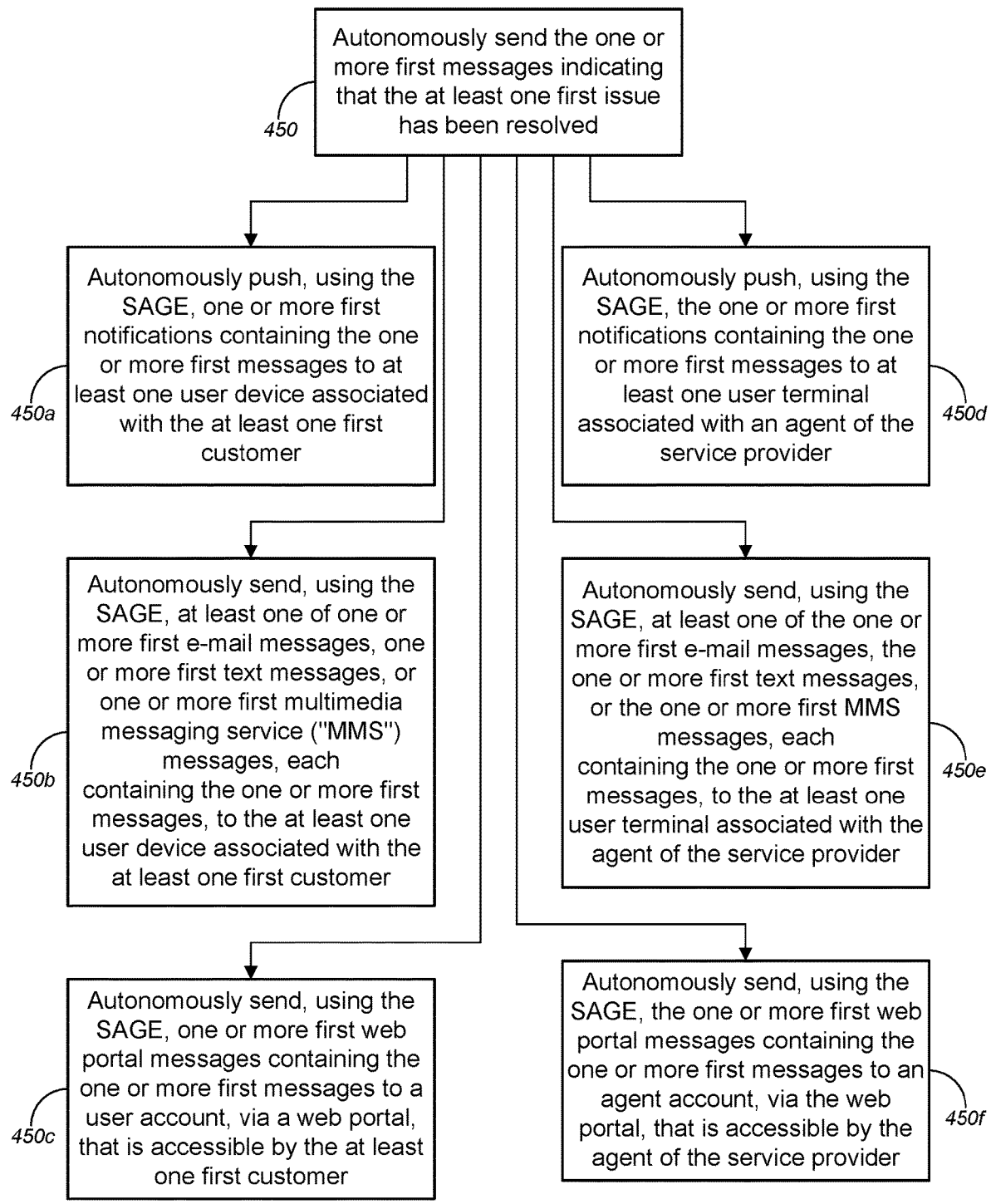
Figure 4E:
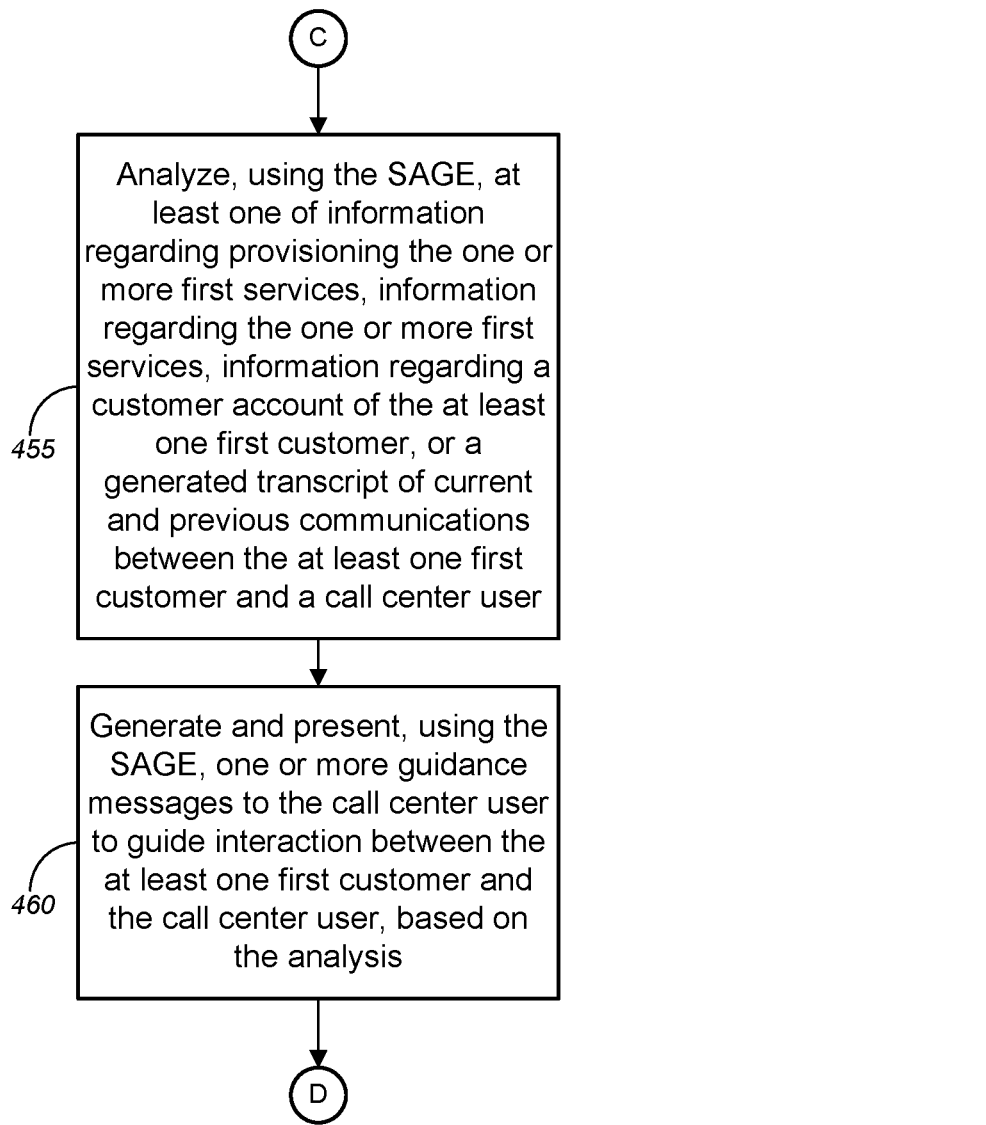

Method 400 may continue onto one or more of the process at block 430 in FIG. 4B following the circular marker denoted, "A," the process at block 445 in FIG. 4C following the circular marker denoted, "B," the process at block 455 in FIG. 4E following the circular marker denoted, "C," and/or the process at block 405.

In some embodiments, the first data may comprise data associated with provisioning services to all customers of the service provider. At block 430 in FIG. 4B (following the circular marker denoted, "A," in FIG. 4A), method 400 may comprise autonomously analyzing, using the SAGE, the first data to identify at least one of any common issues, any related issues, or any widespread issues, and/or the like, with provisioning services, among the plurality of services, to a plurality of second customers of the service provider. Method 400 may further comprise, based on a determination that at least one second issue affects provisioning of at least one second service among the one or more second services, autonomously identifying, using the SAGE, one or more second automation actions to address the determined at least one second issue (block 435); and autonomously sending, using the SAGE, one or more second instructions to one or more second automation bots, among the plurality of automation bots, to perform the identified one or more second automation actions (block 440). Method 400 may return to the process at block 405 in FIG. 4A following the circular marker denoted, "D."

At block 445 in FIG. 4C (following the circular marker denoted, "B," in FIG. 4A), method 400 may comprise, based on a determination that the one or more first automation bots have successfully resolved the at least one first issue via the identified one or more first automation actions and based on a determination that dispatch records of the service provider indicate that a field technician has already been dispatched to address the at least one first issue, autonomously sending, using the SAGE, one or more third instructions cancelling the dispatchment of the field technician to address the at least one first issue. Method 400 may further comprise, at block 450, autonomously sending, using the SAGE, one or more first messages indicating that the at least one first issue has been resolved. Method 400 may return to the process at block 405 in FIG. 4A following the circular marker denoted, "D."

With reference to FIG. 4D, autonomously sending the one or more first messages indicating that the at least one first issue has been resolved (at block 450) may comprise at least one of: autonomously pushing, using the SAGE, one or more first notifications containing the one or more first messages to at least one user device associated with the at least one first customer (at block 450a); autonomously sending, using the SAGE, at least one of one or more first e-mail messages, one or more first text messages, one or more first multimedia messaging service ("MMS") messages, and/or the like, each containing the one or more first messages, to the at least one user device associated with the at least one first customer (at block 450b); autonomously sending, using the SAGE, one or more first web portal messages containing the one or more first messages to a user account, via a web portal, that is accessible by the at least one first customer (at block 450c); autonomously pushing, using the SAGE, the one or more first notifications containing the one or more first messages to at least one user terminal associated with an agent of the service provider (at block 450d); autonomously sending, using the SAGE, at least one of the one or more first e-mail messages, the one or more first text messages, the one or more first MMS messages, and/or the like, each containing the one or more first messages, to the at least one user terminal associated with the agent of the service provider (at block 450e); or autonomously sending, using the SAGE, the one or more first web portal messages containing the one or more first messages to an agent account, via the web portal, that is accessible by the agent of the service provider (at block 450f); and/or the like.

At block 455 in FIG. 4E (following the circular marker denoted, "C," in FIG. 4A), method 400 may comprise, analyzing, using the SAGE, at least one of information regarding provisioning the one or more first services, information regarding the one or more first services, information regarding a customer account of the at least one first customer, or a generated transcript of current and previous communications between the at least one first customer and a call center user. Method 400 may comprise, at block 460, generating and presenting, using the SAGE, one or more guidance messages to the call center user to guide interaction between the at least one first customer and the call center user, based on the analysis. Method 400 may return to the process at block 405 in FIG. 4A following the circular marker denoted, "D."

Exemplary System and Hardware Implementation

Figure 5:
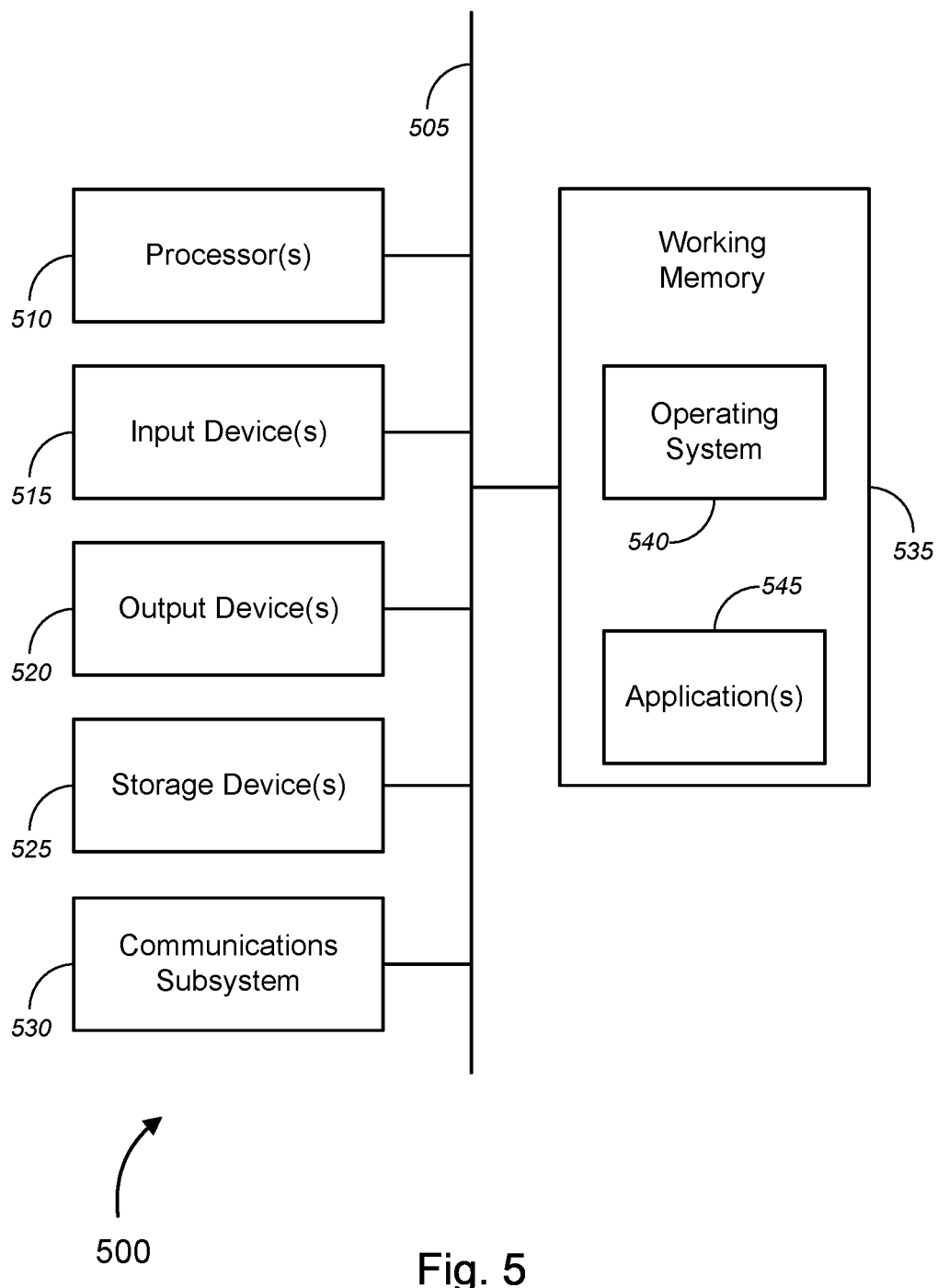
FIG. 5 is a block diagram illustrating an exemplary computer or system hardware architecture, in accordance with various embodiments.

FIG. 5 is a block diagram illustrating an exemplary computer or system hardware architecture, in accordance with various embodiments. FIG. 5 provides a schematic illustration of one embodiment of a computer system 500 of the service provider system hardware that can perform the methods provided by various other embodiments, as described herein, and/or can perform the functions of computer or hardware system (i.e., automated services platform 105a, 105b, and 205, user terminals 115a-115n and 215, service action guidance engines ("SAGEs") 125a, 125b, and 225, customer premises equipment ("CPE") 135a-135n and 235, user devices 140a-140n and 240, nodes 155a-155n, 160a-160n, 255a-255n, and 260a-260n, data sources 170a-170n, 175a-175n, 270, 271a-271n, 272a-272n, 273a-273n, 274a-274n, 276a-276n, 277a-277n, and 278a-278n, automation bots 180a-180n and 280a-280n, and orchestration system 185 and 285, etc.), as described above. It should be noted that FIG. 5 is meant only to provide a generalized illustration of various components, of which one or more (or none) of each may be utilized as appropriate. FIG. 5, therefore, broadly illustrates how individual system elements may be implemented in a relatively separated or relatively more integrated manner.

The computer or hardware system 500—which might represent an embodiment of the computer or hardware system (i.e., automated services platform 105a, 105b, and 205, user terminals 115a-115n and 215, SAGEs 125a, 125b, and 225, CPE 135a-135n and 235, user devices 140a-140n and 240, nodes 155a-155n, 160a-160n, 255a-255n, and 260a-260n, data sources 170a-170n, 175a-175n, 270, 271a-271n, 272a-272n, 273a-273n, 274a-274n, 276a-276n, 277a-277n, and 278a-278n, automation bots 180a-180n and 280a-280n, and orchestration system 185 and 285, etc.), described above with respect to FIGS. 1-4—is shown comprising hardware elements that can be electrically coupled via a bus 505 (or may otherwise be in communication, as appropriate). The hardware elements may include one or more processors 510, including, without limitation, one or more general-purpose processors and/or one or more special-purpose processors (such as microprocessors, digital signal processing chips, graphics acceleration processors, and/or the like); one or more input devices 515, which can include, without limitation, a mouse, a keyboard, and/or the like; and one or more output devices 520, which can include, without limitation, a display device, a printer, and/or the like.

The computer or hardware system 500 may further include (and/or be in communication with) one or more storage devices 525, which can comprise, without limitation, local and/or network accessible storage, and/or can include, without limitation, a disk drive, a drive array, an optical storage device, solid-state storage device such as a random access memory ("RAM") and/or a read-only memory ("ROM"), which can be programmable, flash-updateable, and/or the like. Such storage devices may be configured to implement any appropriate data stores, including, without limitation, various file systems, database structures, and/or the like.

The computer or hardware system 500 might also include a communications subsystem 530, which can include, without limitation, a modem, a network card (wireless or wired), an infra-red communication device, a wireless communication device and/or chipset (such as a Bluetooth™ device, an 802.11 device, a WiFi device, a WiMax device, a WWAN device, cellular communication facilities, etc.), and/or the like. The communications subsystem 530 may permit data to be exchanged with a network (such as the network described below, to name one example), with other computer or hardware systems, and/or with any other devices described herein. In many embodiments, the computer or hardware system 500 will further comprise a working memory 535, which can include a RAM or ROM device, as described above.

The computer or hardware system 500 also may comprise software elements, shown as being currently located within the working memory 535, including an operating system 540, device drivers, executable libraries, and/or other code, such as one or more application programs 545, which may comprise computer programs provided by various embodiments (including, without limitation, hypervisors, VMs, and the like), and/or may be designed to implement methods, and/or configure systems, provided by other embodiments, as described herein. Merely by way of example, one or more procedures described with respect to the method(s) discussed above might be implemented as code and/or instructions executable by a computer (and/or a processor within a computer); in an aspect, then, such code and/or instructions can be used to configure and/or adapt a general purpose computer (or other device) to perform one or more operations in accordance with the described methods.

A set of these instructions and/or code might be encoded and/or stored on a non-transitory computer readable storage medium, such as the storage device(s) 525 described above. In some cases, the storage medium might be incorporated within a computer system, such as the system 500. In other embodiments, the storage medium might be separate from a computer system (i.e., a removable medium, such as a compact disc, etc.), and/or provided in an installation package, such that the storage medium can be used to program, configure, and/or adapt a general purpose computer with the instructions/code stored thereon. These instructions might take the form of executable code, which is executable by the computer or hardware system 500 and/or might take the form of source and/or installable code, which, upon compilation and/or installation on the computer or hardware system 500 (e.g., using any of a variety of generally available compilers, installation programs, compression/decompression utilities, etc.) then takes the form of executable code.

It will be apparent to those skilled in the art that substantial variations may be made in accordance with specific requirements. For example, customized hardware (such as programmable logic controllers, field-programmable gate arrays, application-specific integrated circuits, and/or the like) might also be used, and/or particular elements might be implemented in hardware, software (including portable software, such as applets, etc.), or both. Further, connection to other computing devices such as network input/output devices may be employed.

As mentioned above, in one aspect, some embodiments may employ a computer or hardware system (such as the computer or hardware system 500) to perform methods in accordance with various embodiments of the invention. According to a set of embodiments, some or all of the procedures of such methods are performed by the computer or hardware system 500 in response to processor 510 executing one or more sequences of one or more instructions (which might be incorporated into the operating system 540 and/or other code, such as an application program 545) contained in the working memory 535. Such instructions may be read into the working memory 535 from another computer readable medium, such as one or more of the storage device(s) 525. Merely by way of example, execution of the sequences of instructions contained in the working memory 535 might cause the processor(s) 510 to perform one or more procedures of the methods described herein.

The terms "machine readable medium" and "computer readable medium," as used herein, refer to any medium that participates in providing data that causes a machine to operate in a specific fashion. In an embodiment implemented using the computer or hardware system 500, various computer readable media might be involved in providing instructions/code to processor(s) 510 for execution and/or might be used to store and/or carry such instructions/code (e.g., as signals). In many implementations, a computer readable medium is a non-transitory, physical, and/or tangible storage medium. In some embodiments, a computer readable medium may take many forms, including, but not limited to, non-volatile media, volatile media, or the like. Non-volatile media includes, for example, optical and/or magnetic disks, such as the storage device(s) 525. Volatile media includes, without limitation, dynamic memory, such as the working memory 535. In some alternative embodiments, a computer readable medium may take the form of transmission media, which includes, without limitation, coaxial cables, copper wire, and fiber optics, including the wires that comprise the bus 505, as well as the various components of the communication subsystem 530 (and/or the media by which the communications subsystem 530 provides communication with other devices). In an alternative set of embodiments, transmission media can also take the form of waves (including without limitation radio, acoustic, and/or light waves, such as those generated during radio-wave and infra-red data communications).

Common forms of physical and/or tangible computer readable media include, for example, a floppy disk, a flexible disk, a hard disk, magnetic tape, or any other magnetic medium, a CD-ROM, any other optical medium, punch cards, paper tape, any other physical medium with patterns of holes, a RAM, a PROM, and EPROM, a FLASH-EPROM, any other memory chip or cartridge, a carrier wave as described hereinafter, or any other medium from which a computer can read instructions and/or code.

Various forms of computer readable media may be involved in carrying one or more sequences of one or more instructions to the processor(s) 510 for execution. Merely by way of example, the instructions may initially be carried on a magnetic disk and/or optical disc of a remote computer. A remote computer might load the instructions into its dynamic memory and send the instructions as signals over a transmission medium to be received and/or executed by the computer or hardware system 500. These signals, which might be in the form of electromagnetic signals, acoustic signals, optical signals, and/or the like, are all examples of carrier waves on which instructions can be encoded, in accordance with various embodiments of the invention.

The communications subsystem 530 (and/or components thereof) generally will receive the signals, and the bus 505 then might carry the signals (and/or the data, instructions, etc. carried by the signals) to the working memory 535, from which the processor(s) 505 retrieves and executes the instructions. The instructions received by the working memory 535 may optionally be stored on a storage device 525 either before or after execution by the processor(s) 510.

Figure 6:
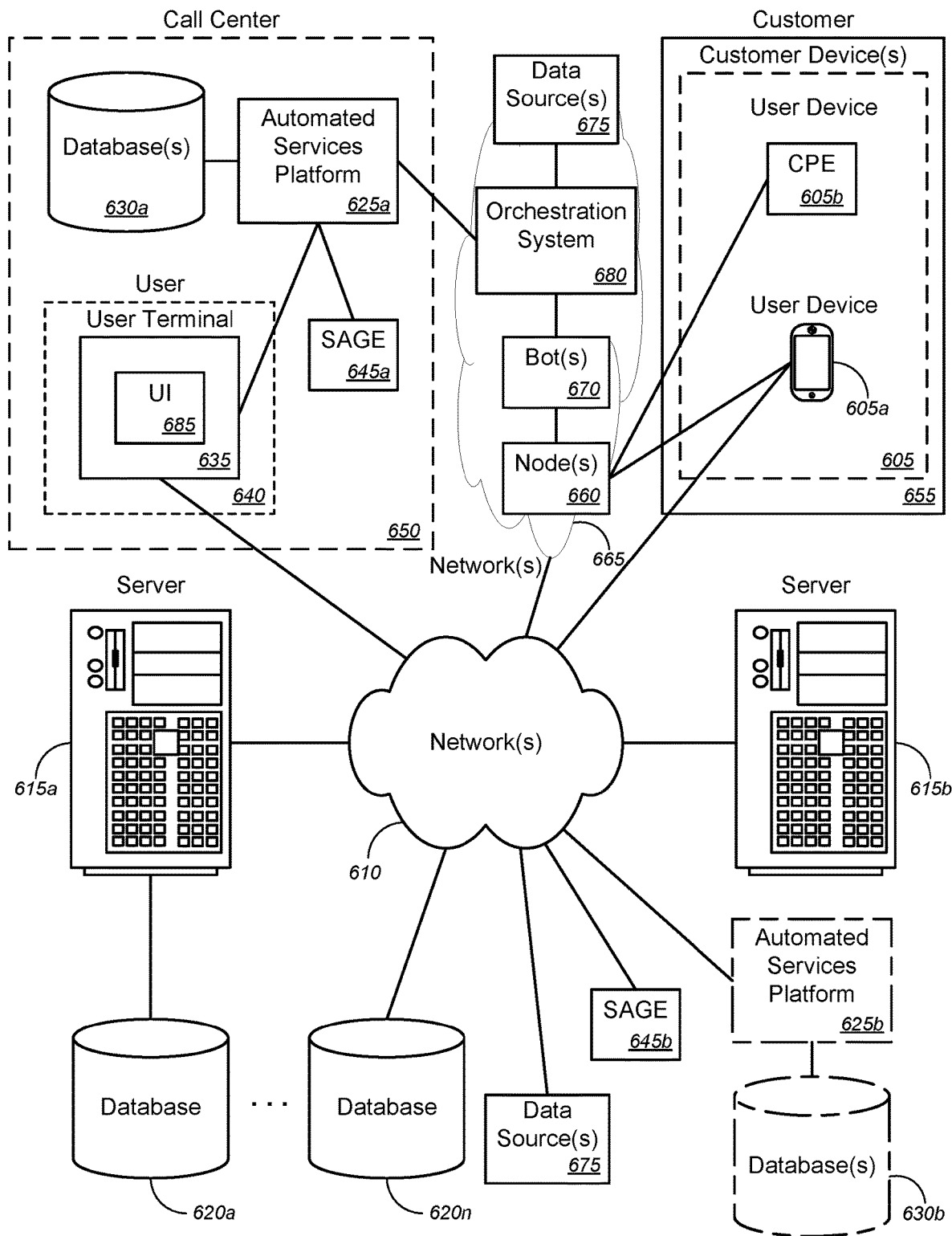
FIG. 6 is a block diagram illustrating a networked system of computers, computing systems, or system hardware architecture, which can be used in accordance with various embodiments.

As noted above, a set of embodiments comprises methods and systems for implementing service diagnostics and provisioning, and, more particularly, to methods, systems, and apparatuses for implementing service diagnostics and provisioning via a service action guidance engine ("SAGE"). FIG. 6 illustrates a schematic diagram of a system 600 that can be used in accordance with one set of embodiments. The system 600 can include one or more user computers, user devices, or customer devices 605. A user computer, user device, or customer device 605 can be a general purpose personal computer (including, merely by way of example, desktop computers, tablet computers, laptop computers, handheld computers, and the like, running any appropriate operating system, several of which are available from vendors such as Apple, Microsoft Corp., and the like), cloud computing devices, a server(s), and/or a workstation computer(s) running any of a variety of commercially-available UNIX™ or UNIX-like operating systems. A user computer, user device, or customer device 605 can also have any of a variety of applications, including one or more applications configured to perform methods provided by various embodiments (as described above, for example), as well as one or more office applications, database client and/or server applications, and/or web browser applications. Alternatively, a user computer, user device, or customer device 605 can be any other electronic device, such as a thin-client computer, Internet-enabled mobile telephone, and/or personal digital assistant, capable of communicating via a network (e.g., the network(s) 610 described below) and/or of displaying and navigating web pages or other types of electronic documents. Although the exemplary system 600 is shown with two user computers, user devices, or customer devices 605, any number of user computers, user devices, or customer devices can be supported.

Certain embodiments operate in a networked environment, which can include a network(s) 610. The network(s) 610 can be any type of network familiar to those skilled in the art that can support data communications using any of a variety of commercially-available (and/or free or proprietary) protocols, including, without limitation, TCP/IP, SNA™, IPX™, AppleTalk™, and the like. Merely by way of example, the network(s) 610 (similar to network(s) 165a-165n and 265 of FIGS. 1 and 2, or the like) can each include a local area network ("LAN"), including, without limitation, a fiber network, an Ethernet network, a Token-Ring™ network, and/or the like; a wide-area network ("WAN"); a wireless wide area network ("WWAN"); a virtual network, such as a virtual private network ("VPN"); the Internet; an intranet; an extranet; a public switched telephone network ("PSTN"); an infra-red network; a wireless network, including, without limitation, a network operating under any of the IEEE 802.11 suite of protocols, the Bluetooth™ protocol known in the art, and/or any other wireless protocol; and/or any combination of these and/or other networks. In a particular embodiment, the network might include an access network of the service provider (e.g., an Internet service provider ("ISP")). In another embodiment, the network might include a core network of the service provider, and/or the Internet.

Embodiments can also include one or more server computers 615. Each of the server computers 615 may be configured with an operating system, including, without limitation, any of those discussed above, as well as any commercially (or freely) available server operating systems. Each of the servers 615 may also be running one or more applications, which can be configured to provide services to one or more clients 605 and/or other servers 615.

Merely by way of example, one of the servers 615 might be a data server, a web server, a cloud computing device(s), or the like, as described above. The data server might include (or be in communication with) a web server, which can be used, merely by way of example, to process requests for web pages or other electronic documents from user computers 605. The web server can also run a variety of server applications, including HTTP servers, FTP servers, CGI servers, database servers, Java servers, and the like. In some embodiments of the invention, the web server may be configured to serve web pages that can be operated within a web browser on one or more of the user computers 605 to perform methods of the invention.

The server computers 615, in some embodiments, might include one or more application servers, which can be configured with one or more applications accessible by a client running on one or more of the client computers 605 and/or other servers 615. Merely by way of example, the server(s) 615 can be one or more general purpose computers capable of executing programs or scripts in response to the user computers 605 and/or other servers 615, including, without limitation, web applications (which might, in some cases, be configured to perform methods provided by various embodiments). Merely by way of example, a web application can be implemented as one or more scripts or programs written in any suitable programming language, such as Java™, C, C#™ or C++, and/or any scripting language, such as Perl, Python, or TCL, as well as combinations of any programming and/or scripting languages. The application server(s) can also include database servers, including, without limitation, those commercially available from Oracle™, Microsoft™, Sybase™, IBM™, and the like, which can process requests from clients (including, depending on the configuration, dedicated database clients, API clients, web browsers, etc.) running on a user computer, user device, or customer device 605 and/or another server 615. In some embodiments, an application server can perform one or more of the processes for implementing service diagnostics and provisioning, and, more particularly, to methods, systems, and apparatuses for implementing service diagnostics and provisioning via SAGE, as described in detail above. Data provided by an application server may be formatted as one or more web pages (comprising HTML, JavaScript, etc., for example) and/or may be forwarded to a user computer 605 via a web server (as described above, for example). Similarly, a web server might receive web page requests and/or input data from a user computer 605 and/or forward the web page requests and/or input data to an application server. In some cases, a web server may be integrated with an application server.

In accordance with further embodiments, one or more servers 615 can function as a file server and/or can include one or more of the files (e.g., application code, data files, etc.) necessary to implement various disclosed methods, incorporated by an application running on a user computer 605 and/or another server 615. Alternatively, as those skilled in the art will appreciate, a file server can include all necessary files, allowing such an application to be invoked remotely by a user computer, user device, or customer device 605 and/or server 615.

It should be noted that the functions described with respect to various servers herein (e.g., application server, database server, web server, file server, etc.) can be performed by a single server and/or a plurality of specialized servers, depending on implementation-specific needs and parameters.

In certain embodiments, the system can include one or more databases 620a-620n (collectively, "databases 620"). The location of each of the databases 620 is discretionary: merely by way of example, a database 620a might reside on a storage medium local to (and/or resident in) a server 615a (and/or a user computer, user device, or customer device 605). Alternatively, a database 620n can be remote from any or all of the computers 605, 615, so long as it can be in communication (e.g., via the network 610) with one or more of these. In a particular set of embodiments, a database 620 can reside in a storage-area network ("SAN") familiar to those skilled in the art. (Likewise, any necessary files for performing the functions attributed to the computers 605, 615 can be stored locally on the respective computer and/or remotely, as appropriate.) In one set of embodiments, the database 620 can be a relational database, such as an Oracle database, that is adapted to store, update, and retrieve data in response to SQL-formatted commands. The database might be controlled and/or maintained by a database server, as described above, for example.

According to some embodiments, system 600 might further comprise an automated services platform 625a and corresponding database(s) 630a (similar to automated services platform 105a and 205 and corresponding database(s) 110a of FIGS. 1-3, or the like), user terminal 635 operated by user 640 (similar to user terminals 115a-115n and 215 operated by corresponding users 120a-120n and 220 of FIGS. 1-3, or the like), and a service action guidance engine ("SAGE") 645a (similar to SAGEs 125a, 125b, and 225 of FIGS. 1-3, or the like), all of which may be disposed at call center 650 (similar to call center 130 of FIG. 1, or the like). Alternative or additional to local automated services platform 625a and corresponding database(s) 630a, system 600 may further comprise remote automated services platform 625b and corresponding database(s) 630b (similar to automated services platform 105b and corresponding database(s) 110b of FIG. 1, or the like). Similarly, alternative or additional to local SAGE 645a, system 600 may further comprise remote SAGE 645b (similar to SAGEs 125a, 125b, and 225 of FIGS. 1-3, or the like). System 600 may further comprise user device 605a and user customer premises equipment ("CPE") 605b associated with customer 655 (similar to user devices 140a-140n and 240 and customer premises equipment ("CPE") 135a-135n and 235 associated with customers 150a-150n and 250 of FIGS. 1-3, or the like).

System 600 may further comprise one or more nodes 660 (similar to nodes 155a-155n, 160a-160n, 255a-255n, and 260a-260n of FIGS. 1 and 2, or the like) in network(s) 665 (similar to networks 165a-165n and 265 of FIGS. 1-3, or the like) over which customer 655 may communicate with user terminal 635 at call center 650 using customer device 605 (e.g., user device 605a or 605b, or the like). In some cases, network(s) 655 may be the same as network(s) 610. Alternatively, network(s) 655 may be different from network(s) 610. System 600 may further comprise one or more automation bots 670 (similar to automation bots 180a-180n and 280a-280n of FIGS. 1-3, or the like), one or more data sources 675 (similar to data sources 170a-170n, 175a-175n, 270, 271a-271n, 272a-272n, 273a-273n, 274a-274n, 276a-276n, 277a-277n, and 278a-278n of FIGS. 1-3, or the like), and orchestration system 680 (similar to orchestration system 185 and 285 of FIGS. 1-3, or the like). The one or more nodes 660, the one or more automation bots 670, at least some of the data sources 675, and the orchestration system 680 may be disposed in network(s) 665, or the like. System 600 may further comprise user interface ("UI") 685 (similar to UIs 190a-190n and 290 of FIGS. 1-3, or the like) on user terminal 635.

In operation, SAGE 645a and/or 645b (collectively, "service action guidance engine," or "SAGE," or the like) may receive first data from at least one of an automated services platform (e.g., automated services platform 625a or 625b, or the like) or one or more data sources (e.g., data sources 675a-675n and/or 675a-675n, or the like). SAGE may autonomously analyze the first data to identify any issues with provisioning one or more first services, among a plurality of services, to at least one first customer (e.g., customer 655, or the like) of a service provider. In some cases, autonomously analyzing the first data to identify any issues with provisioning the one or more first services to the at least one first customer may comprise at least one of continually, periodically, randomly, or reactively monitoring second data to identify any new issues with provisioning the one or more first services to the at least one first customer.

In some instances, the second data may include, without limitation, at least one of the first data, historical data associated with provisioning the one or more first services to the at least one first customer, or updated data associated with provisioning the one or more first services to the at least one first customer, and/or the like. In some cases, reactively monitoring the second data may comprise monitoring the second data in response to one or more trigger events. In some embodiments, the one or more trigger events may include, but are not limited to, at least one of a determined change in data associated with provisioning the one or more first services, a request to change at least one configuration of one or more nodes for provisioning the one or more first services, a request to change at least one setting of the one or more nodes for provisioning the one or more first services, a request to change at least one configuration of a network profile associated with the at least one first customer, a request to change at least one setting of the network profile associated with the at least one first customer, a determined change in at least one configuration of the one or more nodes for provisioning the one or more first services, a determined change in at least one setting of the one or more nodes for provisioning the one or more first services, a determined change in at least one configuration of the network profile associated with the at least one first customer, or a determined change in at least one setting of the network profile associated with the at least one first customer, and/or the like.

In some embodiments, SAGE may autonomously identify one or more first automation actions from a plurality of automation actions to address at least one first issue identified based on the analysis, and may autonomously send one or more first instructions to one or more first automation bots, among a plurality of automation bots (e.g., automation bots 670a-670n, or the like), to perform the identified one or more first automation actions. In some instances, information regarding the plurality of automation actions may be contained within a library of automation actions that are stored in a database (e.g., database(s) 630a or 630b, or the like), where autonomously identifying the one or more first automation actions to address the determined at least one first issue may comprise SAGE autonomously identifying the one or more first automation actions from the plurality of automation actions contained within the library of automation actions that are stored in the database, to address the at least one first issue.

According to some embodiments, autonomously analyzing the first data to identify any issues with provisioning the one or more first services and autonomously identifying the one or more first automation actions from the plurality of automation actions may each be performed using at least one of a machine learning ("ML") system, a deep learning ("DL") system, or an artificial intelligence ("AI") system, and/or the like.

In some embodiments, the first data may be collected by an automated services platform from each of one or more first data sources among a plurality of data sources by collecting the first data from each data source containing data directly associated with provisioning the one or more first services to the at least one first customer and from each data source containing data indirectly associated with provisioning the one or more first services. In some cases, the data indirectly associated with provisioning the one or more first services may include, but is not limited to, at least one of data retrieved from an outage reporting system that collects outage data associated with provisioning the one or more first services, data associated with provisioning the one or more first services that has been posted via an application programming interface ("API") call by the outage reporting system, data associated with other customers in proximity to the at least one first customer, data associated with network nodes along potential network paths configured to provision the one or more first services, or data associated with services unassociated with the one or more first services yet indicative of geographical events, natural events, or events caused by humans that are determined to have a non-zero probability of affecting provisioning of the one or more first services to the at least one first customer, and/or the like.

In some cases, the automated services platform may manage connections, and may communicate, with each of the plurality of data sources (e.g., data sources 675-675, or the like) and with each of the plurality of automation bots (e.g., automation bots 670, or the like), the plurality of data sources and the plurality of automation bots being disposed within one or more networks (e.g., network(s) 665a-665n, or the like) providing the one or more first services. In some instances, managing connections, and communicating, with each of the plurality of data sources may be performed via a first API between the automated services platform and each of the plurality of data sources, and managing connections, and communicating, with each of the plurality of automation bots may be performed via a second API between the automated services platform and each of the plurality of automation bots.

Alternatively, collecting first data from each of the plurality of data sources may comprise collecting data from each of the plurality of data sources via an orchestration system (e.g., orchestration system 680, or the like), where autonomously sending the one or more first instructions to the one or more first automation bots may comprise autonomously sending the one or more first instructions to the one or more first automation bots via the orchestration system. In such cases, the first API may communicatively couple the orchestration system with each of the plurality of data sources, and the second API may communicatively couple the orchestration system with each of the plurality of automation bots, while a third API may communicatively couple the orchestration system with the automated services platform, and a fourth API may communicatively couple the automated services platform with the user terminal.

Merely by way of example, in some cases, the one or more first automation bots may include, but are not limited to, one of: the one or more first data sources, among the plurality of data sources, that collect the first data that is indicative of the at least one first issue; one or more second automation bots that are separate from the one or more first data sources that collect the first data, where the one or more second automation bots are identified subsequent to identifying the one or more first automation actions based on its capability of performing the identified one or more first automation actions; or one or more third automation bots that are separate from the one or more first data sources that collect the first data, where the one or more third automation bots are selected for performing the identified one or more first automation actions based on proximity to at least one of a source of the at least one first issue or a determined location for implementing the identified one or more first automation actions; and/or the like.

In some embodiments, SAGE may analyze at least one of information regarding provisioning the one or more first services, information regarding the one or more first services, information regarding a customer account of the at least one first customer, or a generated transcript of current and previous communications between the at least one first customer and a call center user, and/or the like. SAGE may then generate and present one or more guidance messages to the call center user to guide interaction between the at least one first customer and the call center user, based on the analysis.

These and other functions of the system 600 (and its components) are described in greater detail above with respect to FIGS. 1-4.

While certain features and aspects have been described with respect to exemplary embodiments, one skilled in the art will recognize that numerous modifications are possible. For example, the methods and processes described herein may be implemented using hardware components, software components, and/or any combination thereof. Further, while various methods and processes described herein may be described with respect to particular structural and/or functional components for ease of description, methods provided by various embodiments are not limited to any particular structural and/or functional architecture but instead can be implemented on any suitable hardware, firmware and/or software configuration. Similarly, while certain functionality is ascribed to certain system components, unless the context dictates otherwise, this functionality can be distributed among various other system components in accordance with the several embodiments.

Moreover, while the procedures of the methods and processes described herein are described in a particular order for ease of description, unless the context dictates otherwise, various procedures may be reordered, added, and/or omitted in accordance with various embodiments. Moreover, the procedures described with respect to one method or process may be incorporated within other described methods or processes; likewise, system components described according to a particular structural architecture and/or with respect to one system may be organized in alternative structural architectures and/or incorporated within other described systems. Hence, while various embodiments are described with—or without—certain features for ease of description and to illustrate exemplary aspects of those embodiments, the various components and/or features described herein with respect to a particular embodiment can be substituted, added and/or subtracted from among other described embodiments, unless the context dictates otherwise. Consequently, although several exemplary embodiments are described above, it will be appreciated that the invention is intended to cover all modifications and equivalents within the scope of the following claims.

What is claimed is:

1. A method, comprising:
    autonomously analyzing, using a service action guidance engine ("SAGE"), first data to identify any issues with provisioning one or more first services, among a plurality of services, to at least one first customer of a service provider;
    autonomously identifying, using the SAGE, one or more first automation actions from a plurality of automation actions to address at least one first issue identified based on the analysis; and
    autonomously sending, using the SAGE, one or more first instructions to one or more first automation bots, among a plurality of automation bots, to perform the identified one or more first automation actions,
    wherein autonomously analyzing the first data to identify any issues with provisioning the one or more first services to the at least one first customer comprises at least one of continually, periodically, randomly, or reactively monitoring second data to identify any new issues with provisioning the one or more first services to the at least one first customer,
    wherein the second data comprises at least one of the first data, historical data associated with provisioning the one or more first services to the at least one first customer, or updated data associated with provisioning the one or more first services to the at least one first customer,
    wherein reactively monitoring the second data comprises monitoring the second data in response to one or more trigger events, wherein the one or more trigger events comprises at least one of:
    a determined change in data associated with provisioning the one or more first services,
    a request to change at least one configuration of one or more nodes for provisioning the one or more first services,
    a request to change at least one setting of the one or more nodes for provisioning the one or more first services,
    a request to change at least one configuration of a network profile associated with the at least one first customer,
    a request to change at least one setting of the network profile associated with the at least one first customer,
    a determined change in at least one configuration of the one or more nodes for provisioning the one or more first services,
    a determined change in at least one setting of the one or more nodes for provisioning the one or more first services,
    a determined change in at least one configuration of the network profile associated with the at least one first customer, or
    a determined change in at least one setting of the network profile associated with the at least one first customer.

2. The method of claim 1, wherein the SAGE comprises at least one of a service diagnostics computing system, a service provisioning computing system, a service management computing system, a call center computing system, a machine learning ("ML") system, a deep learning ("DL") system, an artificial intelligence ("AI") system, a network operations center ("NOC") computing system, a server computer, a webserver, a cloud computing system, or a distributed computing system.

3. The method of claim 1, wherein information regarding the plurality of automation actions is contained within a library of automation actions that are stored in a database, wherein autonomously identifying the one or more first automation actions to address the determined at least one first issue comprises autonomously identifying, using the SAGE, the one or more first automation actions from the plurality of automation actions contained within the library of automation actions that are stored in the database, to address the at least one first issue.

4. The method of claim 1, wherein the first data comprises data associated with provisioning services to all customers of the service provider, wherein the method further comprises:
    autonomously analyzing, using the SAGE, the first data to identify at least one of any common issues, any related issues, or any widespread issues with provisioning services, among the plurality of services, to a plurality of second customers of the service provider;
    based on a determination that at least one second issue affects provisioning of at least one second service among the one or more second services, autonomously identifying, using the SAGE, one or more second automation actions to address the determined at least one second issue; and
    autonomously sending, using the SAGE, one or more second instructions to one or more second automation bots, among the plurality of automation bots, to perform the identified one or more second automation actions.

5. The method of claim 1, wherein the first data is collected by an automated services platform from each of one or more first data sources among a plurality of data sources by collecting the first data from each data source containing data directly associated with provisioning the one or more first services to the at least one first customer and from each data source containing data indirectly associated with provisioning the one or more first services, wherein the data indirectly associated with provisioning the one or more first services comprises at least one of data retrieved from an outage reporting system that collects outage data associated with provisioning the one or more first services, data associated with provisioning the one or more first services that has been posted via an application programming interface ("API") call by the outage reporting system, data associated with other customers in proximity to the at least one first customer, data associated with network nodes along potential network paths configured to provision the one or more first services, or data associated with services unassociated with the one or more first services yet indicative of geographical events, natural events, or events caused by humans that are determined to have a non-zero probability of affecting provisioning of the one or more first services to the at least one first customer.

6. The method of claim 5, wherein the plurality of data sources comprises at least one of one or more network data sources, one or more network extended data sources, one or more customer data sources, one or more customer account data sources, one or more billing data sources, one or more dispatch data sources, one or more network tools, or one or more nodes disposed in at least one network via which at least one service among the plurality of services is provisioned.

7. The method of claim 5, wherein the automated services platform manages connections, and communicates, with each of the plurality of data sources and with each of the plurality of automation bots, the plurality of data sources and the plurality of automation bots being disposed within one or more networks providing the one or more first services.

8. The method of claim 7, wherein managing connections, and communicating, with each of the plurality of data sources is performed via a first API between the automated services platform and each of the plurality of data sources, wherein managing connections, and communicating, with each of the plurality of automation bots is performed via a second API between the automated services platform and each of the plurality of automation bots.

9. The method of claim 8, wherein collecting first data from each of the plurality of data sources comprises collecting data from each of the plurality of data sources via an orchestration system, wherein autonomously sending the one or more first instructions to the one or more first automation bots comprises autonomously sending the one or more first instructions to the one or more first automation bots via the orchestration system, wherein the first API communicatively couples the orchestration system with each of the plurality of data sources, wherein the second API communicatively couples the orchestration system with each of the plurality of automation bots, wherein a third API communicatively couples the orchestration system with the automated services platform, and wherein a fourth API communicatively couples the automated services platform with the user terminal.

10. The method of claim 5, wherein the one or more first automation bots comprise one of:
the one or more first data sources, among the plurality of data sources, that collect the first data that is indicative of the at least one first issue;
one or more second automation bots that are separate from the one or more first data sources that collect the first data, wherein the one or more second automation bots are identified subsequent to identifying the one or more first automation actions based on its capability of performing the identified one or more first automation actions; or
one or more third automation bots that are separate from the one or more first data sources that collect the first data, wherein the one or more third automation bots are selected for performing the identified one or more first automation actions based on proximity to at least one of a source of the at least one first issue or a determined location for implementing the identified one or more first automation actions.

11. The method of claim 1, further comprising:
based on a determination that the one or more first automation bots have successfully resolved the at least one first issue via the identified one or more first automation actions and based on a determination that dispatch records of the service provider indicate that a field technician has already been dispatched to address the at least one first issue, autonomously sending, using the SAGE, one or more third instructions cancelling the dispatchment of the field technician to address the at least one first issue.

12. The method of claim 11, further comprising:
autonomously sending, using the SAGE, one or more first messages indicating that the at least one first issue has been resolved.

13. The method of claim 1, wherein autonomously analyzing the first data to identify any issues with provisioning the one or more first services and autonomously identifying the one or more first automation actions from the plurality of automation actions are each performed using at least one of a machine learning ("ML") system, a deep learning ("DL") system, or an artificial intelligence ("AI") system.

14. The method of claim 1, further comprising:
analyzing, using the SAGE, at least one of information regarding provisioning the one or more first services, information regarding the one or more first services, information regarding a customer account of the at least one first customer, or a generated transcript of current and previous communications between the at least one first customer and a call center user; and
generating and presenting, using the SAGE, one or more guidance messages to the call center user to guide interaction between the at least one first customer and the call center user, based on the analysis.

15. A service action guidance engine ("SAGE"), comprising:
at least one processor; and
a non-transitory computer readable medium communicatively coupled to the at least one processor, the non-transitory computer readable medium having stored thereon computer software comprising a set of instructions that, when executed by the at least one processor, causes the SAGE to:
autonomously analyze first data to identify any issues with provisioning one or more first services, among a plurality of services, to at least one first customer of a service provider;

autonomously identify one or more first automation actions from a plurality of automation actions to address at least one first issue identified based on the analysis; and autonomously send one or more first instructions to one or more first automation bots, among a plurality of automation bots, to perform the identified one or more first automation actions, wherein autonomously analyzing the first data to identify any issues with provisioning the one or more first services to the at least one first customer comprises at least one of continually, periodically, randomly, or reactively monitoring second data to identify any new issues with provisioning the one or more first services to the at least one first customer, wherein the second data comprises at least one of the first data, historical data associated with provisioning the one or more first services to the at least one first customer, or updated data associated with provisioning the one or more first services to the at least one first customer, wherein reactively monitoring the second data comprises monitoring the second data in response to one or more trigger events, wherein the one or more trigger events comprises at least one of:

a determined change in data associated with provisioning the one or more first services, a request to change at least one configuration of one or more nodes for provisioning the one or more first services, a request to change at least one setting of the one or more nodes for provisioning the one or more first services, a request to change at least one configuration of a network profile associated with the at least one first customer, a request to change at least one setting of the network profile associated with the at least one first customer, a determined change in at least one configuration of the one or more nodes for provisioning the one or more first services, a determined change in at least one setting of the one or more nodes for provisioning the one or more first services, a determined change in at least one configuration of the network profile associated with the at least one first customer, or a determined change in at least one setting of the network profile associated with the at least one first customer.

16. The SAGE of claim 15, wherein the SAGE comprises at least one of a service diagnostics computing system, a service provisioning computing system, a service management computing system, a call center computing system, a machine learning ("ML") system, a deep learning ("DL") system, an artificial intelligence ("AI") system, a network operations center ("NOC") computing system, a server computer, a webserver, a cloud computing system, or a distributed computing system.

17. A system, comprising:
a computing system, comprising:
at least one first processor; and
a first non-transitory computer readable medium communicatively coupled to the at least one first processor, the first non-transitory computer readable medium having stored thereon computer software comprising a first set of instructions that, when executed by the at least one first processor, causes the computing system to:
autonomously analyze first data to identify any issues with provisioning one or more first services, among a plurality of services, to at least one first customer of a service provider;
autonomously identify one or more first automation actions from a plurality of automation actions to address at least one first issue identified based on the analysis; and
autonomously send one or more first instructions to one or more first automation bots, among a plurality of automation bots, to perform the identified one or more first automation actions, wherein autonomously analyzing the first data to identify any issues with provisioning the one or more first services to the at least one first customer comprises at least one of continually, periodically, randomly, or reactively monitoring second data to identify any new issues with provisioning the one or more first services to the at least one first customer, wherein the second data comprises at least one of the first data, historical data associated with provisioning the one or more first services to the at least one first customer, or updated data associated with provisioning the one or more first services to the at least one first customer, wherein reactively monitoring the second data comprises monitoring the second data in response to one or more trigger events, wherein the one or more trigger events comprises at least one of:

a determined change in data associated with provisioning the one or more first services, a request to change at least one configuration of one or more nodes for provisioning the one or more first services, a request to change at least one setting of the one or more nodes for provisioning the one or more first services, a request to change at least one configuration of a network profile associated with the at least one first customer, a request to change at least one setting of the network profile associated with the at least one first customer, a determined change in at least one configuration of the one or more nodes for provisioning the one or more first services, a determined change in at least one setting of the one or more nodes for provisioning the one or more first services, a determined change in at least one configuration of the network profile associated with the at least one first customer, or a determined change in at least one setting of the network profile associated with the at least one first customer.

18. The system of claim 17, wherein the computing system comprises at least one of a service action guidance engine ("SAGE"), a service diagnostics computing system, a service provisioning computing system, a service management computing system, a call center computing system, a machine learning ("ML") system, a deep learning ("DL") system, an artificial intelligence ("AI") system, a network operations center ("NOC") computing system, a server computer, a webserver, a cloud computing system, or a distributed computing system.

* * * * *